US012659304B2

(12) United States Patent  (10) Patent No.: US 12,659,304 B2
Pratt et al.  (45) Date of Patent: Jun. 16, 2026

(54) DEVICE AUTHENTICATION SHARING

(71) Applicant: AT&T Intellectual Property I, L.P., Atlanta, GA (US)

(72) Inventors: James Pratt, Round Rock, TX (US); Yupeng Jia, South Pasadena, CA (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 18/770,051

(22) Filed: Jul. 11, 2024

(65) Prior Publication Data

US 2026/0019408 A1  Jan. 15, 2026

(51) Int. Cl.
 H04L 9/40 (2022.01)

(52) U.S. Cl.
 CPC ............ H04L 63/08 (2013.01); H04L 63/107 (2013.01)

(58) Field of Classification Search
 CPC ..... H04L 63/08; H04L 63/20; H04L 63/0876; H04L 63/107; H04L 63/108
 USPC .......................... 709/220, 224–228, 224–229
 See application file for complete search history.

(56) References Cited

U.S. PATENT DOCUMENTS

| | | | | |
|---|---|---|---|---|
| 9,270,603 | B2 * | 2/2016 | Thodupunoori | ........ H04L 45/72 |
| 9,397,989 | B1 * | 7/2016 | Ramalingam | ........... H04L 63/08 |
| 9,571,485 | B2 * | 2/2017 | Le | ....................... H04L 63/0823 |
| 9,635,010 | B2 * | 4/2017 | Counterman | ....... H04L 63/0876 |
| 11,038,838 | B2 * | 6/2021 | Lau | ..................... H04L 61/5007 |
| 11,705,585 | B2 * | 7/2023 | Ha | ......................... H01M 50/46 |
| | | | | 429/218.1 |
| 11,855,999 | B1 * | 12/2023 | Gurinaviciute et al. | .................... |
| | | | | H04L 63/20 |
| 2011/0179478 | A1 * | 7/2011 | Flick | ...................... H04L 9/0822 |
| | | | | 726/9 |
| 2014/0157389 | A1 * | 6/2014 | Mardikar | ............. H04W 12/12 |
| | | | | 726/7 |
| 2014/0181951 | A1 * | 6/2014 | Birkhofer | .......... H04L 63/0218 |
| | | | | 726/12 |
| 2016/0380997 | A1 * | 12/2016 | Blasi | .................. H04L 63/0853 |
| | | | | 726/9 |
| 2017/0264597 | A1 * | 9/2017 | Pizot | ....................... H04L 67/02 |
| 2018/0332016 | A1 * | 11/2018 | Pandey | .............. H04L 63/0807 |
| 2018/0367340 | A1 * | 12/2018 | Shaw | .................. H04L 12/4633 |

(Continued)

FOREIGN PATENT DOCUMENTS

CN  117955674 A  *  4/2024  ............. H04L 63/08

*Primary Examiner* — Khanh Q Dinh
(74) *Attorney, Agent, or Firm* — Hartman & Citrin LLC

(57)  ABSTRACT

Device authentication sharing can include detecting, at a gateway of a local network, authentication of a user device for communication with a first local device that is in communication with the gateway via the local network. The gateway can send, to a second local device operating on the local network, an authentication notice that indicates that the user device has authenticated for communication with the first local device. The gateway can receive from the second local device, a share request requesting sharing of the authentication of the user device with the second local device. The gateway can obtain a token that defines a permission associated with the authentication, a time limit associated with the authentication, and a location limit associated with the authentication. Delivery of the token to the gateway can be triggered, whereby the second local device communicates with the user device via a connection supported by the gateway.

20 Claims, 11 Drawing Sheets

300

START

302 DETECT AUTHENTICATION OF A USER DEVICE

304 PROPAGATE AUTHENTICATION NOTICES TO LOCAL DEVICES

306 RECEIVE A SHARE REQUEST FROM A LOCAL DEVICE

308 OBTAIN TOKEN FROM USER DEVICE AND PROVIDE TO LOCAL DEVICE

310 CONNECT THE USER DEVICE TO THE LOCAL DEVICE

312 MONITOR THE CONNECTION

314 DETERMINE IF THE CONNECTION SHOULD BE TERMINATED?  No

YES

316 TERMINATE THE CONNECTION

318 END

(56) References Cited

U.S. PATENT DOCUMENTS

| | | | |
|---|---|---|---|
| 2019/0289016 A1* | 9/2019 | Malan | A63F 13/73 |
| 2019/0327098 A1* | 10/2019 | Hart | E05B 45/06 |
| 2020/0211002 A1* | 7/2020 | Steinberg | G06Q 20/385 |
| 2020/0259667 A1* | 8/2020 | Garnier | H04L 67/12 |
| 2020/0287726 A1* | 9/2020 | Garnier | H04L 67/12 |
| 2022/0385656 A1* | 12/2022 | Gujarathi | H04L 63/0876 |
| 2022/0407867 A1* | 12/2022 | Rathi | H04W 12/08 |

* cited by examiner

DEVICE AUTHENTICATION SHARING

BACKGROUND

Internet-of-things devices have proliferated recently. This increase in the number of Internet-ready devices has added to the complexity of system (e.g., network) support required to support these devices, and increased the complexity and cost of many operations on the network. Thus, there may be a desire to reduce a complexity of some actions or tasks (e.g., home automation, driving, virtual reality, remote surgery, etc.). With increasingly complex Internet-of-things devices (e.g., having increasing numbers of sensors and/or complexity), challenges for managing these devices may increase.

SUMMARY

The present disclosure is directed to device authentication sharing. A user device can connect to a gateway that is located at a location such as a home, office, business, or the like. The gateway and/or the user device can be configured to connect to an authentication sharing service (e.g., hosted and/or executed at a server computer). The user device can authenticate with the authentication sharing service, and the authentication sharing service can determine if the user device is to be authenticated to connect to one or more local devices (e.g., Internet-of-things devices) on a local network associated with the gateway. The authentication sharing service also can be configured to determine contours of any authentication such as, for example, a duration of any granted access to one or more of the local devices, location and/or proximity limitations (if any) of any granted access to the one or more local devices, content limitations (if any) of any granted access to the one or more local devices, data transfer limitations (if any) of any granted access to the one or more local devices, delegation rights and/or limitations (if granted and/or if any) on the access granted to the one or more local devices, other parameters illustrated and described herein, and/or the like. The authentication sharing service can determine, based on the these and/or other parameters, access to be granted. The authentication sharing service can generate a token that captures the granted access and any limitations thereon. The authentication sharing service can provide the token to the user device and/or the gateway.

The gateway can be configured to detect the authentication of the user device (e.g., via receiving the token from the user device and/or the server computer) and to notify one or more of the local devices that the user device has connected to the local network and is authenticated. The local devices may optionally respond with a share request (that requests extension and/or sharing of the authentication of the user device with these local devices). The user device, the gateway, and/or the authentication sharing service can determine if the authentication should be extended and/or shared, and if so, the authentication can be shared. Devices with which the authentication was shared can communicate securely with the user device (e.g., using the token and/or other technologies). The gateway can also grant the access to the local devices, in some embodiments. In any event, the gateway can monitor activity of the user device and determine, at any time, that any contours of the authentication have been violated (e.g., a timing limitation, a location limitation, a proximity limitation, or the like). If any contour of the authentication has been violated (e.g., if the time duration of the authentication has passed, if the user device has left the local network, if the user device has left a defined location, if the user device has left a required proximity to the local device, or the like), the authentication can be terminated.

Embodiments of the concepts and technologies disclosed herein also can support delegation of authentication by the user device to the delegated device. Thus, for example, if the user device has left the local network, has left a particular location, has left a defined proximity, or the like, the authentication sharing service, the authentication sharing application, and/or the gateway can determine that the authentication should be delegated. If it is determined that the authentication should be delegated, the authentication sharing service, the authentication sharing application, and/or the gateway can determine what devices are included in a device list for the user device (e.g., as delegable devices). If any of the determined devices are connected to the gateway and/or the local network, the authentication sharing application, the authentication sharing service, and/or the gateway can trigger delegation of the authentication to the delegated device (e.g., by delivering the token to the delegated device). It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting, at a gateway of a local network, authentication of a user device for communication with a first local device. The first local device can be in communication with the gateway via the local network. The operations further can include sending, by the gateway and to a second local device operating on the local network, an authentication notice that can indicate that the user device has authenticated for communication with the first local device; receiving, by the gateway and from the second local device, a share request requesting sharing of the authentication of the user device with the second local device; obtaining, by the gateway, a token that defines a permission associated with the authentication, a time limit associated with the authentication, and a location limit associated with the authentication; and triggering delivery of the token to the second local device to share the authentication of the user device with the second local device. Thereby, the second local device can communicate with the user device via a connection supported by the gateway.

In some embodiments, the operations further can include monitoring, by the gateway, the connection to track a time duration of the connection and a location of the user device; determining, by the gateway, if the connection should be terminated based on the time duration, the location of the user device, the time limit, and the location limit; and in response to a determination that the connection should be terminated, revoking the authentication and terminating the connection. In some embodiments, the location limit can include a proximity between the user device and the first local device that must be maintained, and the determination that the connection should be terminated can include a determination that the location of the user device is outside the proximity.

In some embodiments, the operations further can include detecting a delegated device on the local network; detecting the user device leaving the local network; determining if the authentication of the user device should be delegated to the delegated device; and in response to a determination that the authentication of the user device should be delegated to the delegated device, triggering delivery of the token to the delegated device. In some embodiments, in response to detecting that the authentication of the user device has been delegated to the delegated device, notifications from the first local device and from the second local device are sent to the delegated device instead of the user device. In some embodiments, obtaining the token can include receiving, from the user device, the token, wherein the token can include a data file generated by the user device, the data file identifying the permission, the time limit, and the location limit. In some embodiments, the user device can be authenticated by an authentication sharing service hosted by a server computer. Obtaining the token can include receiving, from the server computer, the token. The token can include a data file generated by the user device, the data file identifying the permission, the time limit, and the location limit. In other embodiments, the data file may also contain content that is meant for an ephemeral session between the delegated device and the user device, like an image, audio, or other content-based data that is intended to be consumed or used by the user's device.

According to another aspect of the concepts and technologies disclosed herein, a method is disclosed. The method can include detecting, at a gateway of a local network, authentication of a user device for communication with a first local device. The first local device can be in communication with the gateway via the local network. The method further can include sending, by the gateway and to a second local device operating on the local network, an authentication notice that can indicate that the user device has authenticated for communication with the first local device; receiving, by the gateway and from the second local device, a share request requesting sharing of the authentication of the user device with the second local device; obtaining, by the gateway, a token that defines a permission associated with the authentication, a time limit associated with the authentication, and a location limit associated with the authentication; and triggering delivery of the token to the second local device to share the authentication of the user device with the second local device. Thereby, the second local device can communicate with the user device via a connection supported by the gateway.

In some embodiments, the operations further can include monitoring, by the gateway, the connection to track a time duration of the connection and a location of the user device; determining, by the gateway, if the connection should be terminated based on the time duration, the location of the user device, the time limit, and the location limit; and in response to a determination that the connection should be terminated, revoking the authentication and terminating the connection. In some embodiments, the location limit can include a proximity between the user device and the first local device that must be maintained, and the determination that the connection should be terminated can include a determination that the location of the user device is outside the proximity.

In some embodiments, the operations further can include detecting a delegated device on the local network; detecting the user device leaving the local network; determining if the authentication of the user device should be delegated to the delegated device; and in response to a determination that the authentication of the user device should be delegated to the delegated device, triggering delivery of the token to the delegated device. In some embodiments, in response to detecting that the authentication of the user device has been delegated to the delegated device, notifications from the first local device and from the second local device are sent to the delegated device instead of the user device. In some embodiments, obtaining the token can include receiving, from the user device, the token, wherein the token can include a data file generated by the user device, the data file identifying the permission, the time limit, and the location limit. In some embodiments, the user device can be authenticated by an authentication sharing service hosted by a server computer. Obtaining the token can include receiving, from the server computer, the token. The token can include a data file generated by the user device, the data file identifying the permission, the time limit, and the location limit.

According to yet another aspect of the concepts and technologies disclosed herein, a computer storage medium is disclosed. The computer storage medium can store computer-executable instructions that, when executed by a processor, cause the processor to perform operations. The operations can include detecting, at a gateway of a local network, authentication of a user device for communication with a first local device. The first local device can be in communication with the gateway via the local network. The operations further can include sending, by the gateway and to a second local device operating on the local network, an authentication notice that can indicate that the user device has authenticated for communication with the first local device; receiving, by the gateway and from the second local device, a share request requesting sharing of the authentication of the user device with the second local device; obtaining, by the gateway, a token that defines a permission associated with the authentication, a time limit associated with the authentication, and a location limit associated with the authentication; and triggering delivery of the token to the second local device to share the authentication of the user device with the second local device. Thereby, the second local device can communicate with the user device via a connection supported by the gateway.

In some embodiments, the operations further can include monitoring, by the gateway, the connection to track a time duration of the connection and a location of the user device; determining, by the gateway, if the connection should be terminated based on the time duration, the location of the user device, the time limit, and the location limit; and in response to a determination that the connection should be terminated, revoking the authentication and terminating the connection. In some embodiments, the location limit can include a proximity between the user device and the first local device that must be maintained, and the determination that the connection should be terminated can include a determination that the location of the user device is outside the proximity.

In some embodiments, the operations further can include detecting a delegated device on the local network; detecting the user device leaving the local network; determining if the authentication of the user device should be delegated to the delegated device; and in response to a determination that the authentication of the user device should be delegated to the delegated device, triggering delivery of the token to the delegated device. In some embodiments, in response to detecting that the authentication of the user device has been delegated to the delegated device, notifications from the first local device and from the second local device are sent to the delegated device instead of the user device. In some embodiments, obtaining the token can include receiving, from the user device, the token, wherein the token can include a data file generated by the user device, the data file identifying the permission, the time limit, and the location limit. In some embodiments, the user device can be authenticated by an authentication sharing service hosted by a server computer. Obtaining the token can include receiving, from the server computer, the token. The token can include a data file generated by the user device, the data file identifying the permission, the time limit, and the location limit.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
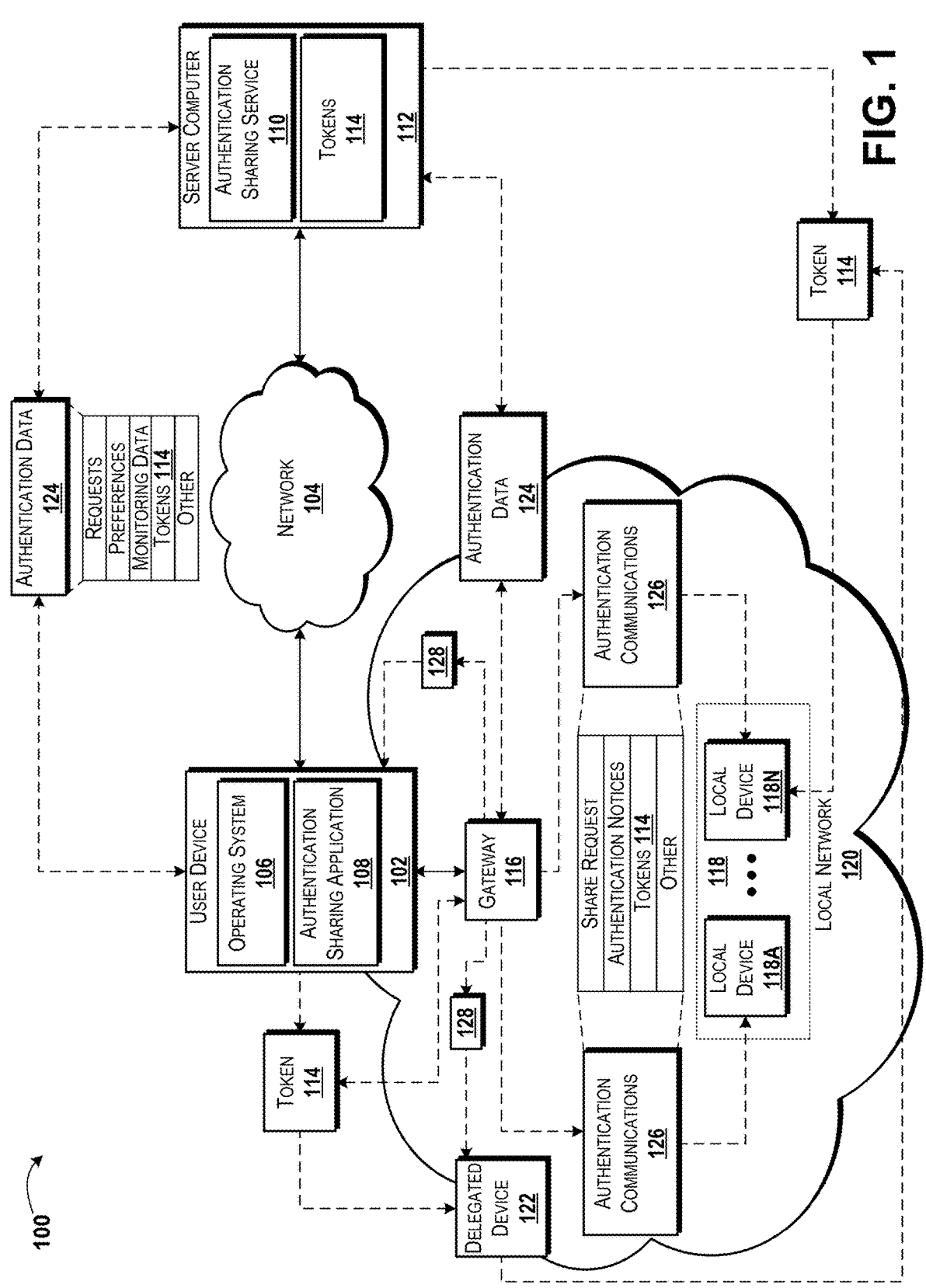
FIG. 1 is a system diagram illustrating an illustrative operating environment for various embodiments of the concepts and technologies described herein.

The following detailed description is directed to device authentication sharing. A user device can connect to a gateway that is located at a location such as a home, office, business, or the like. The gateway and/or the user device can be configured to connect to an authentication sharing service (e.g., hosted and/or executed at a server computer). The user device can authenticate with the authentication sharing service, and the authentication sharing service can determine if the user device is to be authenticated to connect to one or more local devices on a local network associated with the gateway. The authentication sharing service also can be configured to determine contours of any authentication such as, for example, a duration of any granted access to one or more of the local devices, location and/or proximity limitations (if any) of any granted access to the one or more local devices, content limitations (if any) of any granted access to the one or more local devices, data transfer limitations (if any) of any granted access to the one or more local devices, delegation rights and/or limitations (if granted and/or if any) on the access granted to the one or more local devices, other parameters illustrated and described herein, and/or the like. The authentication sharing service can determine, based on the these and/or other parameters, access to be granted. The authentication sharing service can generate a token that captures the granted access and any limitations thereon. The authentication sharing service can provide the token to the user device and/or the gateway.

The gateway can be configured to detect the authentication of the user device (e.g., via receiving the token from the user device and/or the server computer) and to notify one or more of the local devices that the user device has connected to the local network and is authenticated. The local devices may optionally respond with a share request (that requests extension and/or sharing of the authentication of the user device with these local devices). The user device, the gateway, and/or the authentication sharing service can determine if the authentication should be extended and/or shared, and if so, the authentication can be shared. Devices with which the authentication was shared can communicate securely with the user device (e.g., using the token and/or other technologies). The gateway can also grant the access to the local devices, in some embodiments. In any event, the gateway can monitor activity of the user device and determine, at any time, that any contours of the authentication have been violated (e.g., a timing limitation, a location limitation, a proximity limitation, or the like). If any contour of the authentication has been violated (e.g., if the time duration of the authentication has passed, if the user device has left the local network, if the user device has left a defined location, if the user device has left a required proximity to the local device, or the like), the authentication can be terminated.

Embodiments of the concepts and technologies disclosed herein also can support delegation of authentication by the user device to the delegated device. Thus, for example, if the user device has left the local network, has left a particular location, has left a defined proximity, or the like, the authentication sharing service, the authentication sharing application, and/or the gateway can determine that the authentication should be delegated. If it is determined that the authentication should be delegated, the authentication sharing service, the authentication sharing application, and/or the gateway can determine what devices are included in a device list for the user device (e.g., as delegable devices). If any of the determined devices are connected to the gateway and/or the local network, the authentication sharing application, the authentication sharing service, and/or the gateway can trigger delegation of the authentication to the delegated device (e.g., by delivering the token to the delegated device). It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for device authentication sharing will be described, according to an illustrative embodiment. The operating environment 100 shown in FIG. 1 includes a user device 102. The user device 102 can operate in communication with and/or as part of a communications network ("network") 104, though this is not necessarily the case in all embodiments.

According to various embodiments, the functionality of the user device 102 may be provided by one or more server computers, desktop computers, mobile telephones, laptop computers, set-top boxes, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, an authentication sharing application 108. The operating system 106 can include a computer program that can control the operation of the user device 102. The authentication sharing application 108 can include an executable program that can be configured to execute on top of the operating system 106 to provide various functions as illustrated and described herein. The functionality of the authentication sharing application 108 will be described in more detail after introducing other entities in the operating environment 100.

As shown in FIG. 1, the user device 102 (e.g., via execution of the authentication sharing application 108) can be configured to communicate with an authentication sharing service 110, which can be hosted and/or executed by a computing device or resource such as, for example, a server computer 112. The functionality of the authentication sharing service 110 will be described in more detail after introducing other entities in the operating environment 100. According to various embodiments of the concepts and technologies disclosed herein, the functionality of the server computer 112 may be provided by one or more server computers, application servers, web servers, other computing systems, and the like. It should be understood that the functionality of the server computer 112 may be provided by a single device, by two or more similar devices, and/or by two or more dissimilar devices. For purposes of describing the concepts and technologies disclosed herein, the server computer 112 is described herein as an application server. It should be understood that this embodiment is illustrative, and should not be construed as being limiting in any way.

The server computer 112 also can create, store, and/or access (e.g., at an external data storage device, data storage resource, server, or the like) one or more tokens 114. As used herein, each of the tokens 114 can include data and/or instructions that can define authentication information (e.g., permissions, restrictions, time limits, location or proximity requirements, or the like) for a particular user or entity such as the user device 102 and/or devices in communication with the user device 102 as illustrated and described herein. Each of the tokens 114 can be configured as a transferable data file that, when in possession of a second user or entity, can be used to obtain access and/or permissions to a particular resource such as a file, device, system, or the like, in a manner that can be substantially similar to the access and/or permissions possessed by the first user or entity. It should be understood that this example embodiment is illustrative, and therefore should not be construed as being limiting in any way. Additional details of the authentication sharing service 110 and the tokens 114 will be illustrated and described in more detail after introducing other elements of the operating environment 100.

The operating environment 100 also can include a gateway 116. According to various embodiments of the concepts and technologies disclosed herein, the functionality of the gateway 116 may be provided by one or more home gateway devices, home routers, business gateway devices, business routers, various types of customer premises equipment ("CPE"), other computing devices, and/or the like. It should be understood that the functionality of the gateway 116 may be provided by a single device, by two or more similar devices, and/or by two or more dissimilar devices. For purposes of describing the concepts and technologies disclosed herein, the gateway 116 is described herein as a gateway device for a physical location or premises ("premises") such as a home, office, business, or the like (e.g., a home gateway device, or the like). According to various embodiments of the concepts and technologies disclosed herein, the boundaries of the premises can be defined as the extents of a radio-based networking device of the gateway 116, for example, a WiFi range of the gateway 116, a Bluetooth range of the gateway 116, or the like. It should be understood that this embodiment is illustrative, and should not be construed as being limiting in any way. In a related embodiment, a gateway 116 may also be a federated local gateway for a particular business (e.g., a laundromat), a mesh network for a set of devices that share a proximity (e.g., a set of smart vehicles, UAVs, or connected scooters), or a public infrastructure gateway that connects to a sensor array (e.g., street lights, law enforcement androids, or public audio-visual systems).

The gateway 116 can also operate in communication with the network 104 in some embodiments. As is generally understood, the gateway 116 can be configured to connect to any number of devices, networks, addresses, or the like to an external network such as the network 104, and also can act as an intermediary between devices local to (e.g., in a local communication range of) the gateway 116 and external devices that are not local to the gateway 116 such as, for example, the user device 102 and one or more local devices 118A-N (hereinafter collectively and/or generically referred to as "local devices 118"). According to various embodiments of the concepts and technologies disclosed herein, the local devices 118 can include one or more Internet-of-things devices. It should be understood that this example embodiment is illustrative, and therefore should not be construed as being limiting in any way.

As described in the previous section, a group or collection of local devices 118 such as Internet-of-things devices may be a homogenous or heterogeneous set of devices that are provided and/or operate a) by a manufacturer (a fleet of unmanned aerial vehicles ("UAVs"), e.g., for providing networking coverage or the like), b) for a specific intent (e.g., washing machines, audio-video devices in a karaoke or performance venue, or the like), and/or c) located at a specific location (e.g., a laundromat, an arcade, and/or the like). In another embodiment, the local devices may also be a part of the gateway 116 itself (e.g., a microphone array, location-sensing light detection and ranging ("LiDAR") devices, and/or connected cameras) and/or other devices that can beam-form connectivity or functionality that is coupled with other gateway 116 functionality. With no loss of generality, in some embodiments of the concepts and technologies disclosed herein the local devices (e.g., Internet-of-things devices and/or other devices) may be connected exclusively to the gateway 116 and have no other means of network connectivity (e.g., devices may be restricted by protocol, network type, security restrictions for trusted or sensitive functionalities, physical connections, etc.). It should be understood that this example embodiment is illustrative, and therefore should not be construed as being limiting in any way.

The gateway 116 can therefore establish a local network 120, which can include the gateway 116 and one or more of the devices that are in the short-range communication range of the gateway 116 (e.g., via WiFi signals, Bluetooth signals, or the like), such as the user device 102, the local devices 118, and/or other devices such as a delegated device 122. According to various embodiments of the concepts and technologies disclosed herein, the delegated device 122 can correspond to a smartphone, computer, laptop or tablet computer, smartwatch, or the like. In some embodiments, the delegated device 122 can also execute a copy of the authentication sharing application 108, can be substantially similar to the user device 102, and/or can include other types of devices. These and/or other aspects of the concepts and technologies disclosed herein will be illustrated and described in more detail herein. It should be understood that these example embodiments are illustrative, and therefore should not be construed as being limiting in any way.

Returning now to the authentication sharing application 108, according to various embodiments of the concepts and technologies disclosed herein, the authentication sharing application 108 can be configured to manage authentication of the user device 102. In particular, the authentication sharing application 108 can be configured to manage the authentication of the user device 102 with one or more devices and/or resources such as the local devices 118, to share authentication with one or more local devices 118 with other local devices 118, and/or to delegate authentication with one or more local devices 118 with other devices such as the delegated device 122.

In particular, embodiments of the authentication sharing application 108 can be configured to exchange, with the authentication sharing service 110, authentication data 124. The authentication data 124 can include, but is not limited to, one or more requests, one or more preferences, monitoring data, one or more tokens 114, other data, combinations thereof, or the like. The authentication data 124 can be used by the authentication sharing service 110 to authenticate the user device 102, to determine time and/or proximity limitations on the authentication, to determine if authentication can be delegated to other devices (e.g., the delegated device 122), and the like, as will be illustrated and described herein in more detail.

The requests included in the authentication data 124 can include authentication requests from the user device 102. The authentication requests can correspond to requests, service calls, or the like, which can be interpreted by the authentication sharing service 110 as a request to provide a token 114 to one or more entities and/or otherwise authenticate the user device 102 for communications with one or more of the local devices 118. In some embodiments, the authentication requests can specify one or more local devices 118 that the user device 102 is to communicate with, a time duration for the requested authentication, a distance and/or proximity limitation to be applied to the requested authentication, or the like. In some other embodiments, the time and/or distance or proximity limitations can be applied by the authentication sharing service 110 based on one or more preferences, configurations, settings, and/or other considerations. Because the authentication requests can include additional and/or alternative information as illustrated and described herein, it should be understood that these example contours of the authentication requests are illustrative, and therefore should not be construed as being limiting in any way.

The preferences included in the authentication data 124 can include time limits to be applied to authentications, device lists (e.g., devices that the user device 102 wishes to communicate with (e.g., one or more of the local devices 118)), devices that the user device 102 may wish to delegate authentication to (e.g., the delegated device 122), time limits to be imposed on authentication, distance and/or proximity limitations to be imposed on authentication (e.g., a distance or proximity required between the user device 102 and the device (e.g., the local devices 118 and/or delegated device 122) to maintain the authentication), combinations thereof, or the like. These preferences can be provided at any time by the user device 102, included with an authentication request, stored at the server computer 112 by the user device 102 and/or other entities or devices, combinations thereof, or the like.

The monitoring data included in the authentication data 124 can include communications between the user device 102 and the server computer 112 for monitoring the presence and/or location of the user device 102. In some embodiments of the concepts and technologies disclosed herein, as shown in FIG. 1, the monitoring data (as well as the other components of the authentication data 124 illustrated and described herein) can be exchanged between the gateway 116 and the server computer 112. Thus, it can be appreciated that the gateway 116 can monitor the location of the user device 102, a proximity between the user device 102 and one or more local devices 118, a time for which the user device 102 has been connected to the local network 120 and/or one or more of the local devices 118, a context associated with the user device 102 (e.g., what devices or resources are being accessed by the user device 102, or the like), and other activity associated with the user device 102. This monitoring data can be provided to the authentication sharing service 110 to determine if the user device 102 should be authenticated, if authentication of the user device 102 should be terminated, if the authentication of the user device 102 should be delegated (e.g., to a delegated device 122), combinations thereof, or the like.

According to various embodiments of the concepts and technologies disclosed herein, the gateway 116 can periodically determine if the user device 102 is still connected to the local network 120, where the user device 102 is (in absolute terms and/or relative to one or more of the local devices 118), or otherwise determine location and/or proximity of the user device 102 to one or more of the local devices 118 and/or the gateway 116. Additionally, the gateway 116 can track a time duration for which the user device 102 has been communicating on the local network 120, via the gateway 116, and/or with one or more of the local devices 118. This time duration can be tracked and/or used by the gateway 116 and/or the authentication sharing service 110 as explained in more detail herein. It should be understood that this example embodiment is illustrative, and therefore should not be construed as being limiting in any way.

The tokens 114 included in the authentication data 124 are explained in detail herein, and as shown in FIG. 1, can be provided by the authentication sharing service 110 to the user device 102 and/or the gateway 116, and/or one or more of the local devices 118. It should be understood that this example embodiment is illustrative, and therefore should not be construed as being limiting in any way. The other data included in the authentication data 124 can include other information exchanged between the user device 102 and the server computer 112 and/or the gateway 116 and the server computer 112. Thus, it can be appreciated that the other information can include one or more lists of authorized devices for delegation; contextual information relating to activities, location, proximity, or the like of the user device 102; time information; combinations thereof; or the like.

According to various embodiments of the concepts and technologies disclosed herein, the user device 102 can be configured to authenticate with the authentication sharing service 110. The authentication can be for purposes of interacting and/or communicating with one or more of the local devices 118 and/or with other devices or resources (e.g., services or other resources accessible via the gateway 116). According to various embodiments, the authentication can be completed for purposes of authorizing the user device 102 to exchange data with one or more of the local devices 118. For example, a user or other entity may create an account or otherwise configure access to the local device 118 via interactions with the authentication sharing service 110 in various embodiments of the concepts and technologies disclosed herein. It should be understood that this example embodiment is illustrative, and therefore should not be construed as being limiting in any way.

According to various embodiments of the concepts and technologies disclosed herein, the authentication sharing service 110 can be configured to interact with the user device 102 and/or the gateway 116 (e.g., via an exchange of authentication data 124) to authenticate the user device 102. In some embodiments of the concepts and technologies disclosed herein, the authentication sharing service 110 can be configured to authenticate the user device 102 for communication with the authentication sharing service 110. Thus, the user device 102 or gateway 116 can exchange authentication information (e.g., usernames, passwords, keys, combinations thereof, or the like) with the authentication sharing service 110 in some embodiments before any authentication for communication on the local network 120 is determined.

Upon authentication of the user device 102 with the authentication sharing service 110, the authentication sharing service 110 can determine what permissions and/or access should be granted to the user device 102. This determination can include determining what local devices 118 the user device 102 is to be authorized to access, a time duration for which the access should be granted (if any time limitations are to be imposed), any location limitations (e.g., geographic locations, presence on the local network 120, proximity to one or more of the local devices 118, combinations thereof, or the like) for which the access should be granted (if any location limitations are to be imposed), lists of other devices to which the authentication may be delegated, combinations thereof, or the like. Based on these and/or other parameters, the authentication sharing service 110 can determine parameters of the authentication to be granted to the user device 102, and create and share a token 114 with the user device 102. As explained herein, the token 114 can include data and/or instructions (e.g., computer-executable instructions) that can define authentication information for a particular user or entity (e.g., the user device 102).

As such, the token 114 can define the granted access and the contours thereof. For example, the tokens 114 can define, which local devices 118 may be accessed by the user device 102, what location the user device 102 must be located at to access the local devices 118 (if any location limitations are imposed), a proximity between the user device 102 and the local devices 118 required for the access (if any proximity limitations are imposed), time limitations (if any time limitations are imposed) for which any granted access may persist, delegation rights available (if any delegation rights are granted), combinations thereof, or the like. Because other contours of the authentication granted by the authentication sharing service 110 are illustrated and described herein, the above examples are illustrative and should not be construed as being limiting in any way.

According to various embodiments of the concepts and technologies disclosed herein, the tokens 114 can include, for example, data that defines and/or describes one or more permissions, one or more restrictions, one or more time limits (for the access granted), one or more location or proximity limitations (on the access granted), and the like, for a particular user or entity with respect to one or more resource. As such, the tokens 114 can also be considered, in some embodiments, as being a "smart contract" that can be created/shared to define permissions for a particular device (e.g., the user device 102) and a particular resource or entity (e.g., a local device 118). Furthermore, in various embodiments of the concepts and technologies disclosed herein, the tokens 114 (or "smart contracts") can be shared with other devices to effectively share, by the authenticated party and with one or more other devices or users, the authentication and by extension, the resources and/or entities to which access has been granted. It should be understood that this example embodiment is illustrative, and therefore should not be construed as being limiting in any way.

The authentication sharing service 110 also can be configured to share the token 114 (for the user device 102) with the gateway 116, in some embodiments, and/or to share the token 114 with one or more of the local devices 118. In any event, the user device 102 can access one or more of the local devices 118 after being authenticated as illustrated and described herein. In some embodiments, the user device 102 can send, to the gateway 116 and via a local connection (e.g., a WiFi connection, a Bluetooth connection, or the like) a notification regarding the authentication of the user device 102 with the authentication sharing service 110. It should be understood, however, that in some other embodiments, the server computer 112 can be configured to inform the gateway 116 regarding the authentication of the user device 102 with the authentication sharing service 110. In any event, the gateway 116 may be made aware that the user device 102 has been authenticated by the authentication sharing service 110. It should be understood that this example embodiment is illustrative, and therefore should not be construed as being limiting in any way.

According to embodiments of the concepts and technologies disclosed herein, the user device 102 (e.g., via execution of the authentication sharing application 108) and/or the gateway 116 can be configured to trigger notifications to one or more of the local devices 118 to inform the local devices 118 that the user device 102 is authenticated for communications with one or more of the local devices 118 (e.g., that the user device 102 has been authenticated by the authentication sharing service 110). As will be explained in more detail herein, the notifications can be used to inform one or more of the local devices 118 (for which communications were not initially granted via the authentication of the user device 102) regarding the authentication of the user device 102. This notification can be used to inform the local devices 118 to communicate with some of the local devices 118 and/or to give the local devices 118 an opportunity to connect to the user device 102. Thus, the notifications are provided according to some embodiments of the concepts and technologies disclosed herein to enable the local devices 118 to request sharing of the authentication of the user device 102. It should be understood that this example embodiment is illustrative, and therefore should not be construed as being limiting in any way.

By way of example, a user device 102 may be authenticated (by the authentication sharing service 110) to communicate with a washing machine or the like. In such an embodiment of the concepts and technologies disclosed herein, a notification such as an authentication notice can be sent by the gateway 116 to other local devices 118. For example, a clothes dryer may correspond to another of the local devices 118, and the clothes dryer may be informed via the notification that an authorized device (the user device 102) is on the local network 120. This extension, sharing, or the like of the authentication can be sought for various reasons such as, for example, sharing alerts or notifications (e.g., end-of-cycle notifications, or the like) with a same user who likely is authorized to use both devices and/or is likely to be interested in alerts and/or notifications from both devices. It should be understood that this example embodiment is illustrative, and therefore should not be construed as being limiting in any way.

As shown in FIG. 1, the gateway 116 can be configured to exchange with the local devices 118, one or more authentication communications 126. Thus, it can be appreciated that some of the authentication communications 126 may be sent by the gateway 116 to one or more of the local devices 118, while some of the authentication communications 126 may be sent by one or more of the local devices 118 to the gateway 116. As shown in FIG. 1, the authentication communications 126 can include various types of data that can be shared between the gateway 116 and the local devices 118. Thus, the authentication communications 126 can include, for example, one or more of the authentication notices, one or more share requests, one or more tokens 114, other information, combinations thereof, or the like. It should be understood that these examples of authentication communications 126 are illustrative, and therefore should not be construed as being limiting in any way.

The authentication notices can include a notification and/ or other data that can inform a recipient (e.g., one or more of the local devices 118) that the user device 102 has been authenticated (e.g., by the authentication sharing service 110). These notifications can be sent to inform the other local devices 118 regarding the authentication, thereby giving the other local devices 118 an opportunity to request sharing of the authentication. It can be appreciated that in various embodiments of the concepts and technologies disclosed herein, the local devices 118 can be configured to attempt to connect to local authenticated devices for various purposes. As such, in some embodiments the local devices 118 may be configured to request, by default, sharing of the authentication in response to receiving the authentication notices. In some other embodiments, the user device 102 may be configured to select one or more local devices 118 on a local network, and a user or other entity associated with the user device 102 can select the local devices 118 to which the authentication notices are to be sent. It should be understood that these example embodiments are illustrative, and therefore should not be construed as being limiting in any way.

The share requests can correspond to requests, by the local devices 118, that the authentication of the user device 102 be extended or shared to enable these local devices 118 to communicate with the user device 102. Thus, the authentication notification can be sent to the local devices 118 and one or more of the local devices 118 can be configured to respond to the authentication notification with a share request, in some embodiments. In some other embodiments, the authentication sharing application 108 can be configured to present a user interface ("UI") or other display that can enable a user or other entity associated with the user device 102 to view, select, and/or designate one or more of the local devices 118 for extension or sharing of the granted authentication. In response to such a selection or designation, a command or request can be generated and sent to one or more of the local devices 118 (in addition to, as, and/or instead of the authentication notifications). Because the trigger for sharing the authentication can be activated in additional and/or alternative manners, it should be understood that the above example embodiments are illustrative, and therefore should not be construed as being limiting in any way.

The tokens 114, as explained above, can include data that can define one or more permissions for the user device 102. Thus, for example, the tokens 114 can list one or more permissions associated with the user device 102 such as which local devices 118 the user device 102 can access, what kind of information can be shared with those local devices 118; limits on data transfers, content, and/or transfer rates; time limitations on the access; location and/or proximity limitations on the access; combinations thereof; or the like. Thus, if a local device 118 responds to an authentication notice with a share request, the gateway 116 or other devices can forward, to the requesting local device 118, the token 114, which can define the access being shared or extended. It also should be understood that in various embodiments of the concepts and technologies disclosed herein, the user device 102 and/or the server computer 112 can be configured to send the token 114 to the local devices 118. Thus, it should be understood that the example embodiment shown in FIG. 1 is illustrative, and therefore should not be construed as being limiting in any way.

According to various embodiments of the concepts and technologies disclosed herein, the tokens 114 can also be used to delegate authentication to another device such as the delegated device 122. For example, the user device 102 can be authenticated by the authentication sharing service 110 as illustrated and described herein, and a token 114 can be provided to the user device 102. At some time, the user device 102 may delegate the authentication to the delegated device 122. For example, a user of the user device 102 may have configured notifications 128 from a washing machine (and authenticated with the authentication sharing service 110). The delegated device 122 may have been identified as a device to which authentication can be delegated (e.g., by a user of the user device 102 and/or other entity). Additionally, the delegated device 122 may be determined to be located in communication with the local network 120 (for example, by connecting to the gateway 116).

If the user device 102 is determined to be out of communication with the local network 120 and/or determined to be a defined distance from a local device 118 that has been configured to provide the notifications 128 (or if it is otherwise determined that the authentication should be terminated or delegated to the delegated device 122), the authentication sharing application 108 can be configured to provide the token 114 to the delegated device 122. In some other embodiments, the gateway 116 can be configured to execute an authentication sharing module (not labeled in FIG. 1) to distribute the token 114 to the delegated device 122 when the user device 102 is detected to have left the local network 120 or it is otherwise determined that that the authentication should be delegated. With the delegated device 122 in possession of the token 114, the delegated device 122 can provide the token 114 to the gateway 116 and/or the local devices 118 and can then receive notifications 128 or other communications that otherwise would have been provided to the user device 102. It should be understood that this example embodiment is illustrative, and therefore should not be construed as being limiting in any way.

In practice, a user device 102 can connect to a gateway 116. The gateway 116 and/or the user device 102 can be configured to connect to an authentication sharing service 110 (e.g., hosted and/or executed at the server computer 112). The user device 102 can authenticate with the authentication sharing service 110, and the authentication sharing service 110 can determine if the user device 102 is to be authenticated to connect to one or more local devices 118 on a local network 120 associated with the gateway 116. The authentication sharing service 110 also can be configured to determine contours of any authentication such as, for example, a duration of any granted access to one or more of the local devices 118, location and/or proximity limitations (if any) of any granted access to the one or more local devices 118, content limitations (if any) of any granted access to the one or more local devices 118, data transfer limitations (if any) of any granted access to the one or more local devices 118, delegation rights and/or limitations (if granted and/or if any) on the access granted to the one or more local devices 118, other parameters illustrated and described herein, and/or the like. The authentication sharing service 110 can determine, based on the these and/or other parameters, access to be granted. The authentication sharing service 110 can generate a token 114 that captures the granted access and any limitations thereon. The authentication sharing service 110 can provide the token 114 to the user device 102 and/or the gateway 116.

The gateway 116 can be configured to detect the authentication of the user device 102 (e.g., via receiving the token 114 from the user device 102 and/or the server computer 112) and to notify one or more of the local devices 118 that the user device 102 has connected to the local network 120 and is authenticated. The local devices 118 may optionally respond with a share request (that requests extension and/or sharing of the authentication of the user device 102 with these local devices 118). The user device 102, the gateway 116, and/or the authentication sharing service 110 can determine if the authentication should be extended and/or shared, and if so, the authentication can be shared. Devices with which the authentication was shared can communicate securely with the user device 102 (e.g., using the token 114 and/or other technologies). The gateway 116 can also grant the access to the local devices 118, in some embodiments. In any event, the gateway 116 can monitor activity of the user device 102 and determine, at any time, that any contours of the authentication have been violated (e.g., a timing limitation, a location limitation, a proximity limitation, or the like). If any contour of the authentication has been violated (e.g., if the time duration of the authentication has passed, if the user device 102 has left the local network 120, if the user device 102 has left a defined location, if the user device 102 has left a required proximity to the local device 118, or the like), the authentication can be terminated.

Embodiments of the concepts and technologies disclosed herein also can support delegation of authentication by the user device 102 to the delegated device 122. Thus, for example, if the user device 102 has left the local network 120, has left a particular location, has left the defined proximity, or the like, the authentication sharing service 110, the authentication sharing application 108, and/or the gateway 116 can determine that the authentication should be delegated. If it is determined that the authentication should be delegated, the authentication sharing service 110, the authentication sharing application 108, and/or the gateway 116 can determine what devices are included in a device list for the user device 102 (e.g., as delegable devices). If any of the determined devices are connected to the gateway 116 and/or the local network 120, the authentication sharing application 108, the authentication sharing service 110, and/or the gateway 116 can trigger delegation of the authentication to the delegated device 122 (e.g., by delivering the token 114 to the delegated device 122). It should be understood that this example embodiment is illustrative, and therefore should not be construed as being limiting in any way.

FIG. 1 illustrates one user device 102, one network 104, one server computer 112, one gateway 116, two local devices 118, one local network 120, and one delegated device 122. It should be understood, however, that various implementations of the operating environment 100 can include one or more than one user device 102; one or more than one network 104; one or more than one server computer 112; one or more than one gateway 116; two or more than two local devices 118; one or more than one local network 120; and/or zero, one, or more than one delegated device 122. As such, the illustrated embodiment should be understood as being illustrative, and should not be construed as being limiting in any way.

Figure 2:
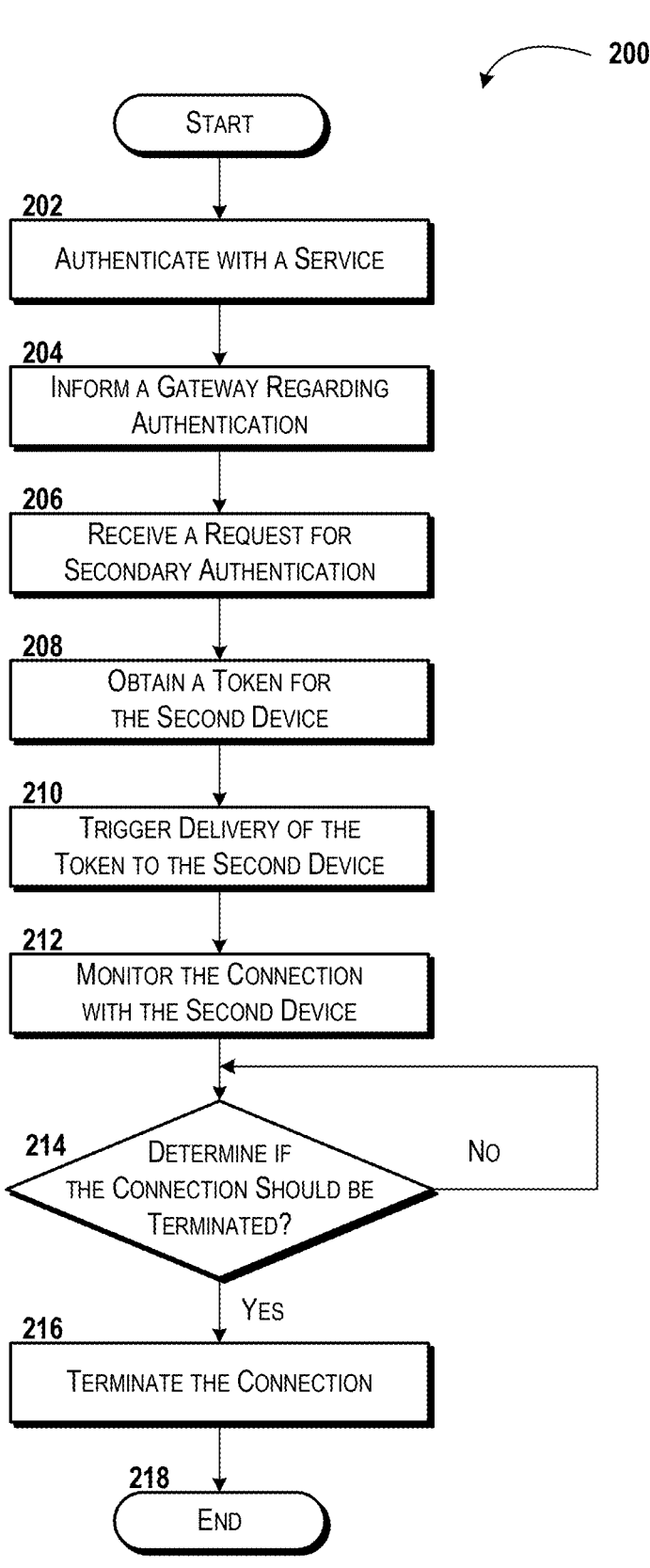
FIG. 2 is a flow diagram showing aspects of a method for user device sharing authentication with a device on a local network, according to an illustrative embodiment of the concepts and technologies described herein.

Turning now to FIG. 2, aspects of a method 200 for user device sharing authentication with a device on a local network will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the server computer 112, the gateway 116, one of the local devices 118, and/or the delegated device 122, to perform one or more operations and/or causing the processor to direct other components of the computing system or device to perform one or more of the operations.

For purposes of illustrating and describing the concepts of the present disclosure, the method 200 is described herein as being performed by the user device 102 via execution of one or more software modules such as, for example, the authentication sharing application 108. It should be understood that additional and/or alternative devices and/or network nodes can provide the functionality described herein via execution of one or more modules, applications, and/or other software including, but not limited to, the authentication sharing application 108. Thus, the illustrated embodiments are illustrative, and should not be viewed as being limiting in any way.

The method 200 begins at operation 202. At operation 202, the user device 102 can authenticate with an authentication sharing service 110. As explained above, the user device 102 can authenticate directly with the authentication sharing service 110 in some embodiments. In some other embodiments, the user device 102 can connect to the gateway 116 and the gateway 116 can tunnel communications from the user device 102 to the authentication sharing service 110 (and/or otherwise enable access to the authentication sharing service 110 such as, for example, accessing a portal, an application programming interface ("API"), or the like exposed by the server computer 112) to enable authentication of the user device 102. Thus, as shown in FIG. 1, the gateway 116 and/or the user device 102 can exchange authentication data 124 with the server computer 112 to effect authentication of the user device 102 in operation 202.

From operation 202, the method 200 can proceed to operation 204. At operation 204, the user device 102 can inform the gateway 116 regarding the authentication of the user device 102. In some embodiments of the concepts and technologies disclosed herein, the user device 102 can inform the gateway 116 that the user device 102 has been authenticated with the authentication sharing service 110 (e.g., in embodiments in which the user device 102 authenticates directly with the authentication sharing service 110 and/or in other embodiments), while in some other embodiments the authentication sharing service 110 may inform the gateway 116 that the user device 102 has been authenticated with the authentication sharing service 110. In yet other embodiments, for example in embodiments in which the gateway 116 orchestrates and/or enables authentication of the user device 102, the gateway 116 can be aware of the authentication of the user device 102 with the authentication sharing service 110. In any event, operation 204 can correspond to the gateway 116 becoming aware that the user device 102 has been authenticated with the authentication sharing service 110. As will explained in more detail herein, the gateway 116 can communicate one or more authentication notices to one or more of the local devices 118, and may receive a share request from one or more local devices 118 in response thereto. It should be understood that this example embodiment is illustrative, and therefore should not be construed as being limiting in any way.

From operation 204, the method 200 can proceed to operation 206. At operation 206, the user device 102 can receive a request to share its authentication (with a first local device 118) with a second local device 118. This request received in operation 206 can be generated by the gateway 116 and relayed to the user device 102 via the local network 120. Thus, in operation 206 the user device 102 can effectively be informed that another local device 118 is requesting to share data with the user device 102 (and therefore requesting extension or sharing of the authentication of the user device 102 with the authentication sharing service 110 with the additional local device 118). It should be understood that this example embodiment is illustrative, and therefore should not be construed as being limiting in any way.

From operation 206, the method 200 can proceed to operation 208. At operation 208, the user device 102 can generate or otherwise obtain a token 114 for the second local device 118 (that requested sharing of the authentication in operation 206). In some embodiments, the user device 102 can request the token 114 from the authentication sharing service 110 in operation 208. In any event, the token 114 obtained in operation 208 can define permissions of the user device 102 and/or various parameters associated with the authentication (e.g., a time duration of the authentication, proximity and/or location limitations on the authentication (if any), and/or other parameters as illustrated and described herein). Thus, the token 114 obtained in operation 208 can correspond to a transferrable and/or sharable file that, when in the possession of another local device 118, can define and/or enable authenticated connections between the local device 118 and the user device 102. It should be understood that these example embodiments are illustrative, and therefore should not be construed as being limiting in any way.

From operation 208, the method 200 can proceed to operation 210. At operation 210, the user device 102 can trigger delivery of the token 114 (the token 114 associated with the authentication completed in operation 202) to the local device 118 that requested sharing of the authentication in operation 206. In some embodiments of the concepts and technologies disclosed herein, operation 210 can correspond to the user device 102 delivering the token 114 to the local device 118 that requested sharing of the authentication. In some other embodiments, the user device 102 can communicate with the authentication sharing service 110 (e.g., by communicating directly with the authentication sharing service 110 and/or by communicating with the authentication sharing service 110 via the gateway 116), and the authentication sharing service 110 can deliver the token 114 to the gateway 116 and/or to the local device 118. Because multiple embodiments are possible and are contemplated, operation 210 can correspond to the user device 102 triggering delivery of the token 114 to the local device 118. It should be understood that this example embodiment is illustrative, and therefore should not be construed as being limiting in any way.

From operation 210, the method 200 can proceed to operation 212. At operation 212, the user device 102 can monitor the connection between the user device 102 and the local device 118 connected to via delivery of the token 114 (triggered in operation 210). Thus, it can be appreciated that the user device 102 also can establish and/or enable a connection with the local device 118 in operation 210 and/or 212 (or other operations). The connection can be monitored by the user device 102. In some embodiments of the concepts and technologies disclosed herein, the user device 102 can monitor the connection using the authentication sharing application 108. In some other embodiments, the connection can be monitored by the gateway 116 (e.g., because the connection between the user device 102 and the local devices 118 can be supported and/or monitored by the gateway 116).

The monitoring of the connection in operation 212 can include tracking and/or monitoring a time for which the connection has existed, tracking and/or monitoring a location of the user device 102, tracking and/or monitoring proximity of the user device 102 to one or more of the local devices 118, and/or tracking and/or monitoring other aspects of the connection. It can be appreciated that the user device 102 (or gateway 116 or authentication sharing service 110) can be configured to determine if a time limit, location limit, proximity limit, or other limit defined for the connection has been satisfied or violated at any time. It should be understood that this example embodiment is illustrative, and therefore should not be construed as being limiting in any way.

From operation 212, the method 200 can proceed to operation 214. At operation 214, the user device 102 can determine if the connection should be terminated. As noted above, the user device 102 can determine if any time limit has been exceeded for the connection, if any location limit has been exceeded for the connection, if any proximity (of the user device 102 to another device such as one or more of the local devices 118) has been exceeded, and/or if any other limitation(s) has or have been exceeded. It should be understood that this example embodiment is illustrative, and therefore should not be construed as being limiting in any way.

If the user device 102 determines, in operation 214, that the connection should not be terminated, execution of the method 200 can return to and/or repeat operation 214. Thus, it can be appreciated that execution of the method 200 can pause at operation 214 until the user device 102 determines, in any iteration of operation 214, that the connection should be terminated. If the user device 102 determines, in operation 214, that the connection should be terminated, the method 200 can proceed to operation 216. At operation 216, the user device 102 can terminate the authentication associated with the connection and/or otherwise terminate the connection. It should be understood that this example embodiment is illustrative, and therefore should not be construed as being limiting in any way.

From operation 216, the method 200 can proceed to operation 218. The method 200 can end at operation 218.

Figure 3:
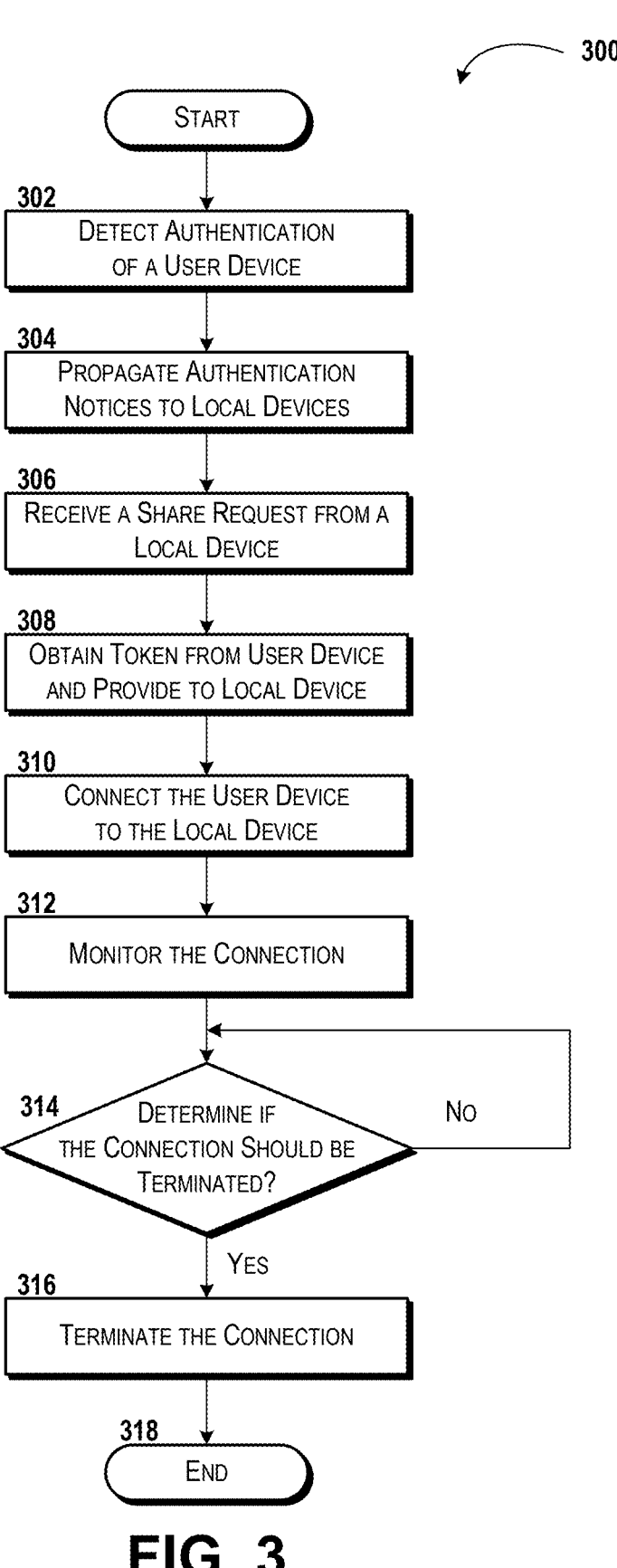
FIG. 3 is a flow diagram showing aspects of a method for a gateway enabling device authentication sharing, according to an illustrative embodiment of the concepts and technologies described herein.

Turning now to FIG. 3, aspects of a method 300 for a gateway enabling device authentication sharing will be described in detail, according to an illustrative embodiment. For purposes of illustrating and describing the concepts of the present disclosure, the method 300 is described herein as being performed by the gateway 116 via execution of one or more software modules such as, for example, an authentication sharing module or other functionality (not illustrated in FIG. 1). It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302. At operation 302, the gateway 116 can detect authentication of the user device 102 with an authentication sharing service 110. As explained above, the user device 102 can authenticate with the authentication sharing service 110 via the gateway 116, in some embodiments. In some other embodiments, the user device 102 can authenticate with the authentication sharing service 110 and inform the gateway 116 regarding the authentication. As such, operation 302 can correspond to the gateway 116 determining or detecting that user device 102 has authenticated with the authentication sharing service 110 in any manner.

From operation 302, the method 300 can proceed to operation 304. At operation 304, the gateway 116 can inform one or more of the local devices 118 regarding the authentication of the user device 102. According to various embodiments of the concepts and technologies disclosed herein, the gateway 116 can propagate one or more authentication notices to the one or more local devices 118 to inform local devices 118 regarding the authentication of the user device 102 with the authentication sharing service 110. As explained above, the authentication notices can be provided to the local devices 118 to enable the local devices 118 to request extension and/or sharing of the authentication. It should be understood that this example embodiment is illustrative, and therefore should not be construed as being limiting in any way.

From operation 304, the method 300 can proceed to operation 306. At operation 306, the gateway 116 can receive a share request from a local device 118. As explained herein, the share request can request that the user device 102 share its authentication (with a first local device 118) with a second local device 118. The share request received in operation 306 can be generated by the second local device 118 and received by the gateway 116 via the local network 120. Thus, in operation 306 the gateway 116 can effectively be informed that another local device 118 is requesting to share data with the gateway 116 (and therefore requesting extension or sharing of the authentication of the user device 102 with the authentication sharing service 110 with the additional local device 118). It should be understood that this example embodiment is illustrative, and therefore should not be construed as being limiting in any way.

From operation 306, the method 300 can proceed to operation 308. At operation 308, the gateway 116 can generate or otherwise obtain a token 114 for the second local device 118 (that requested sharing of the authentication in operation 306). In some embodiments, the gateway 116 can request the token 114 from the authentication sharing service 110 in operation 308. In some other embodiments, the gateway 116 may obtain the token 114 from the user device 102. In yet other embodiments, the gateway 116 may already have the token 114 (e.g., the user device 102 or authentication sharing service 110 may provide the token 114 to the gateway 116 at other times). In any event, the token 114 obtained in operation 308 can define permissions of the user device 102 and/or various parameters associated with the authentication (e.g., a time duration of the authentication, proximity and/or location limitations on the authentication (if any), and/or other parameters as illustrated and described herein). Thus, the token 114 obtained in operation 308 can correspond to a transferrable and/or sharable file that, when in the possession of another local device 118, can define and/or enable authenticated connections between the local device 118 and user device 102. It should be understood that these example embodiments are illustrative, and therefore should not be construed as being limiting in any way.

From operation 308, the method 300 can proceed to operation 310. At operation 310, the gateway 116 can connect the user device 102 to the local device 118 that requested sharing to the authentication. It can be appreciated that operation 310 can correspond to the gateway 116 delivering (or triggering delivery of) the token 114 to the local device 118 that requested sharing of the authentication in operation 306. In some other embodiments, the gateway 116 can communicate with the authentication sharing service 110 (e.g., by communicating directly with the authentication sharing service 110 and/or by communicating with the authentication sharing service 110 via the gateway 116), and the authentication sharing service 110 can deliver the token 114 to the user device 102 and/or to the local device 118. Because multiple embodiments for connecting the user device 102 and the local device 118 are possible and are contemplated, it should be understood that the above examples are illustrative, and therefore should not be construed as being limiting in any way.

From operation 310, the method 300 can proceed to operation 312. At operation 312, the gateway 116 can monitor the connection between the user device 102 and the local device 118 to which the user device 102 connects in operation 310. Thus, it can be appreciated that the gateway 116 also can establish and/or enable a connection with the local device 118 in operation 310 and/or 312 (or other operations). The connection can be monitored by the gateway 116. In some embodiments of the concepts and technologies disclosed herein, the gateway 116 can monitor the connection by virtue of the gateway 116 enabling the connection between the user device 102 and the local devices 118. Because the connection can be monitored in additional and/or alternative manners, it should be understood that these example embodiments are illustrative, and therefore should not be construed as being limiting in any way.

The monitoring of the connection in operation 312 can include tracking and/or monitoring a time for which the connection has existed, tracking and/or monitoring a location of the user device 102, tracking and/or monitoring proximity of the gateway 116 to one or more of the local devices 118, and/or tracking and/or monitoring other aspects of the connection. It can be appreciated that the gateway 116 (or authentication sharing service 110) can be configured to determine if a time limit, location limit, proximity limit, or other limit defined for the connection has been satisfied or violated at any time as part of operation 312 and/or as another operation (not illustrated in FIG. 3). It should be understood that this example embodiment is illustrative, and therefore should not be construed as being limiting in any way.

From operation 312, the method 300 can proceed to operation 314. At operation 314, the gateway 116 can determine if the connection should be terminated. As noted above, the gateway 116 can determine if any time limit has been exceeded for the connection, if any location limit has been exceeded for the connection, if any proximity (of the gateway 116 to another device such as one or more of the local devices 118) has been exceeded, and/or if any other limitation(s) has or have been exceeded. It should be understood that this example embodiment is illustrative, and therefore should not be construed as being limiting in any way.

If the gateway 116 determines, in operation 314, that the connection should not be terminated, execution of the method 300 can return to and/or repeat operation 314. Thus, it can be appreciated that execution of the method 300 can pause at operation 314 until the gateway 116 determines, in any iteration of operation 314, that the connection should be terminated. If the gateway 116 determines, in operation 314, that the connection should be terminated, the method 300 can proceed to operation 316. At operation 316, the gateway 116 can terminate the connection and/or the authentication associated with the connection. It should be understood that this example embodiment is illustrative, and therefore should not be construed as being limiting in any way.

From operation 316, the method 300 can proceed to operation 318. The method 300 can end in operation 318.

Figure 4:
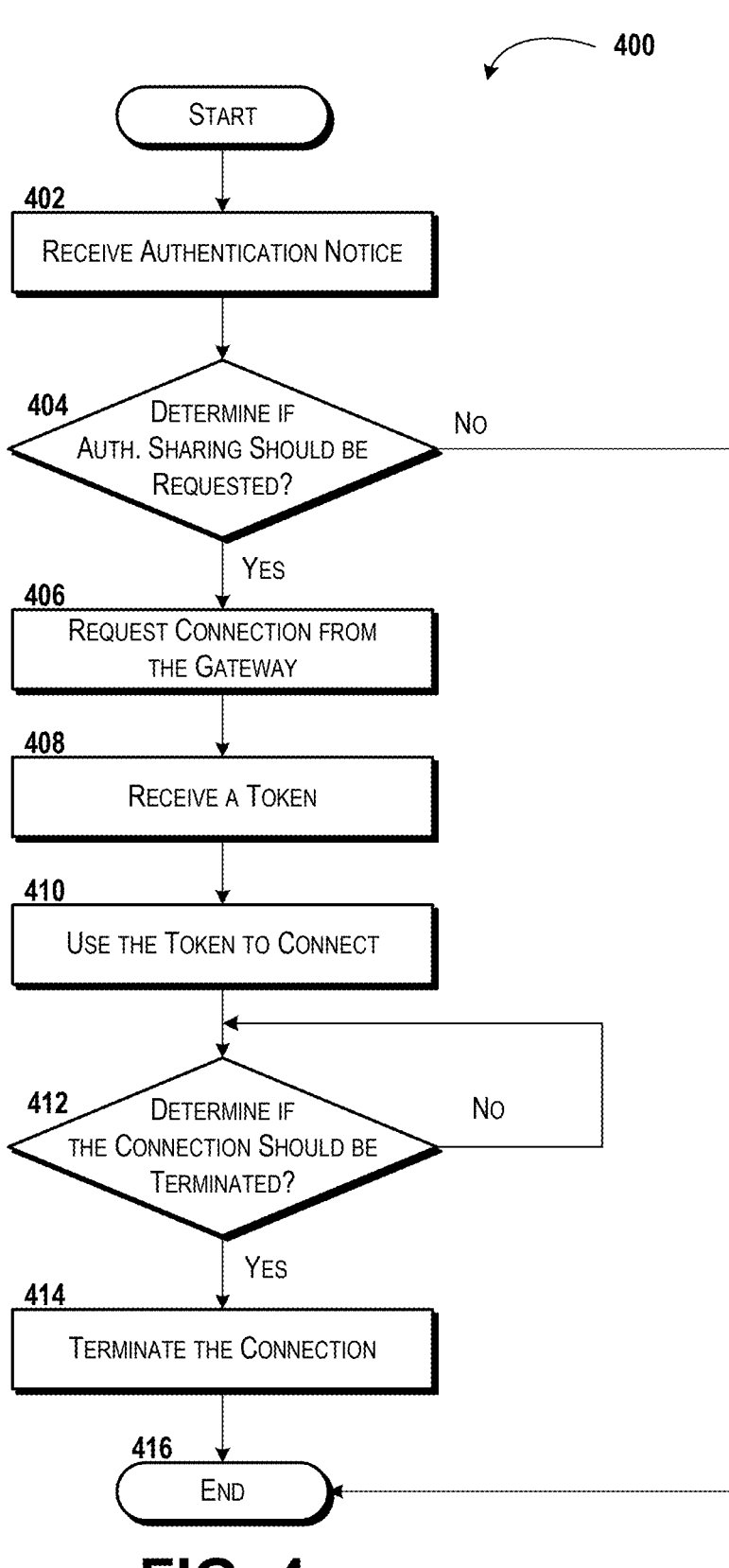
FIG. 4 is a flow diagram showing aspects of a method for a device requesting and obtaining shared device authentication over a local network, according to an illustrative embodiment of the concepts and technologies described herein.

Turning now to FIG. 4, aspects of a method 400 for a device requesting and obtaining shared device authentication over a local network will be described in detail, according to an illustrative embodiment. For purposes of illustrating and describing the concepts of the present disclosure, the method 400 is described herein as being performed by one of the local devices 118 via execution of one or more software modules, routines, programs, or the like. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins at operation 402. At operation 402, the local device 118 can receive an authentication notice from the gateway 116. As explained above with reference to FIGS. 1-3, the gateway 116 can be configured to propagate authentication notices to the local devices 118 when the user device 102 authenticates with the authentication sharing service 110 (and/or at other times). Thus, operation 402 can correspond to the local device 118 receiving one of the authentication notices illustrated and described herein. It should be understood that this example embodiment is illustrative, and therefore should not be construed as being limiting in any way.

From operation 402, the method 400 can proceed to operation 404. At operation 404, the local device 118 can determine if authentication sharing should be requested. Operation 404 can correspond to the local device 118 determining if any notices are deliverable or if the local device 118 should attempt to establish a connection with a device (e.g., the user device 102) based on the authentication notice received in operation 402. Because the local device 118 may by default request authentication sharing, it should be understood that the determination as to whether authentication sharing should be requested may be made in any number of ways.

If the local device determines, in operation 404, that the authentication sharing should be requested, the method 400 can proceed to operation 406. At operation 406, the local device 118 can request, from the gateway 116, sharing of the authentication and/or a connection with the user device 102. As shown in FIG. 1, operation 406 can correspond to the local device 118 sending a share request to the gateway 116. In various embodiments, the share request can identify the user device 102, reference an authentication notice, or otherwise tie authentication of the user device 102 to the share request to simplify sharing of the authentication. It should be understood that this example embodiment is illustrative, and therefore should not be construed as being limiting in any way.

From operation 406, the method 400 can proceed to operation 408. At operation 408, the local device 118 can receive a token 114. In some embodiments of the concepts and technologies disclosed herein, the local device 118 can receive the token 114 in operation 408 from the gateway 116. In some other embodiments, the local device 118 can receive the token 114 in operation 408 from the user device 102 (e.g., via the gateway 116 and/or other connections). Because the token 114 can be passed to the local device in other manners (e.g., from another local device 118, from the server computer 112, or the like), it should be understood that these example embodiments are illustrative, and therefore should not be construed as being limiting in any way.

From operation 408, the method 400 can proceed to operation 410. At operation 410, the local device 118 can use the token 114 to connect to the user device 102. Thus, operation 410 can correspond to the local device 118 establishing connectivity with the user device 102 (or the user device 102 establishing connectivity with the local device 118). From operation 410, the method 400 can proceed to operation 412. At operation 412, the local device 118 can determine if the connection should be terminated.

In operation 412, the local device 118 can determine if any time limit has been exceeded for the connection, if any location limit has been exceeded for the connection, if any proximity (of the user device 102 to the local device 118) has been exceeded, and/or if any other limitation(s) has or have been exceeded. Because other determinations can be made herein to determine if the connection should be terminated, it should be understood that these examples are illustrative, and therefore should not be construed as being limiting in any way.

If the local device 118 determines, in operation 412, that the connection should not be terminated, execution of the method 400 can return to and/or repeat operation 412. Thus, it can be appreciated that execution of the method 400 can pause at operation 412 until the local device 118 determines, in any iteration of operation 412, that the connection should be terminated. If the local device 118 determines, in operation 412, that the connection should be terminated, the method 400 can proceed to operation 414. At operation 414, the local device 118 can terminate the connection and/or the authentication associated with the connection. It should be understood that this example embodiment is illustrative, and therefore should not be construed as being limiting in any way.

From operation 414, the method 400 can proceed to operation 416. The method 400 also can proceed to operation 416 from operation 404 if the local device 118 determines, in operation 404, that the authentication sharing should not be requested. The method 400 can end at operation 416.

Figure 5:
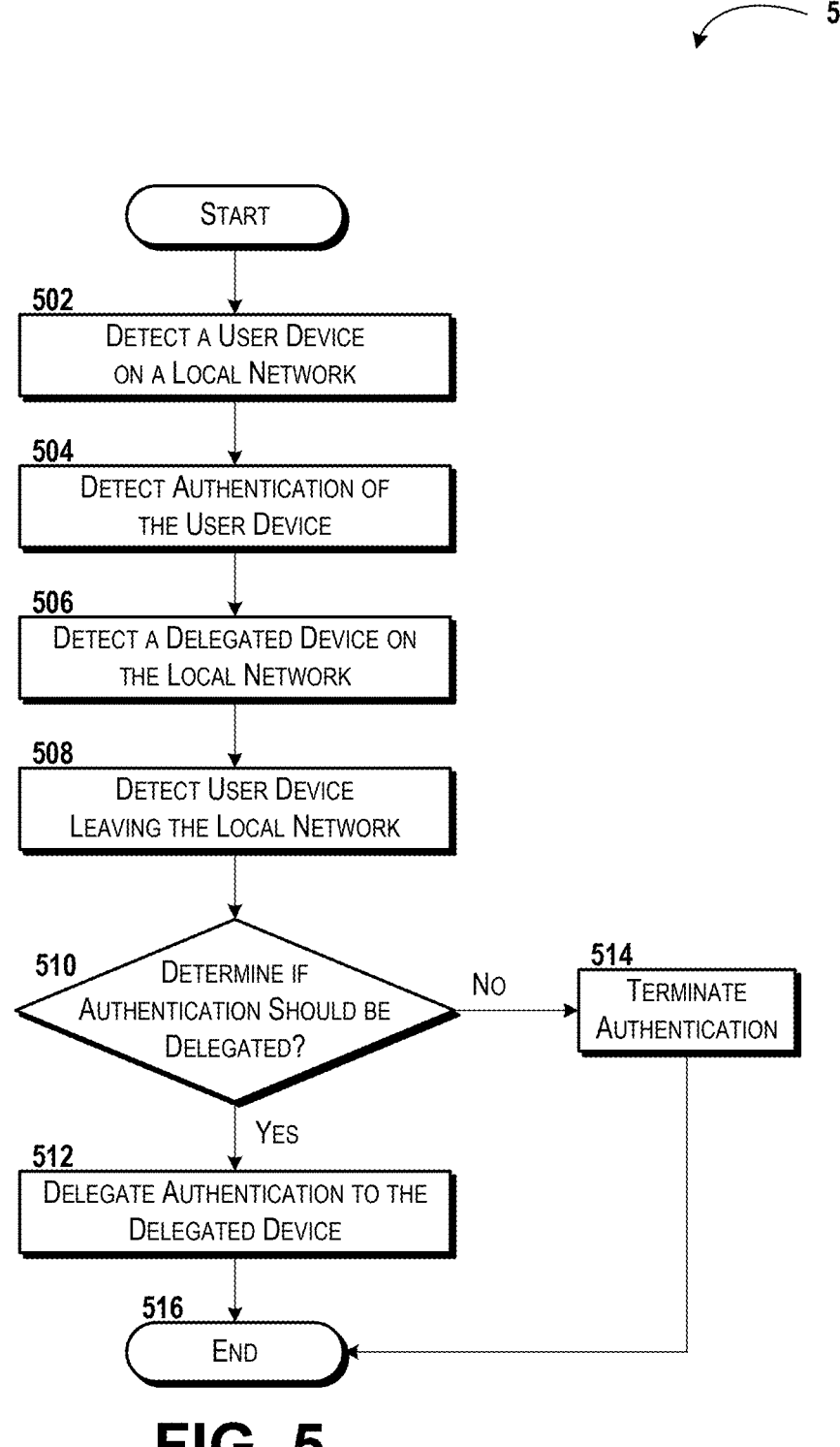
FIG. 5 is a flow diagram showing aspects of a method for a delegated device requesting and obtaining shared device authentication over a local network, according to an illustrative embodiment of the concepts and technologies described herein.

Turning now to FIG. 5, aspects of a method 500 for a delegated device requesting and obtaining shared device authentication over a local network will be described in detail, according to an illustrative embodiment. For purposes of illustrating and describing the concepts of the present disclosure, the method 500 is described herein as being performed by the gateway 116 via execution of one or more software modules. It should be understood that additional and/or alternative devices and/or network nodes can provide the functionality described herein via execution of one or more modules, applications, programs, and/or other software. Thus, the illustrated embodiments are illustrative, and should not be viewed as being limiting in any way.

The method 500 begins at operation 502. At operation 502, the gateway 116 can detect a user device 102 on the local network 120. Operation 502 can correspond to the gateway 116 detecting a connection with the user device 102 or otherwise determining that the user device 102 has joined the local network 120. Because detecting a device connecting to the gateway 116 and/or the local network 120 can be accomplished in various manners, it should be understood that the above examples are illustrative and should not be construed as being limiting in any way.

From operation 502, the method 500 can proceed to operation 504. At operation 504, the gateway 116 can detect authentication of the user device 102. As explained herein, operation 504 can correspond to the gateway 116 receiving an authentication notification from the user device 102, determining that the user device 102 has authenticated (e.g., via monitoring communications occurring via the gateway 116), and/or otherwise determining that the user device 102 has been authenticated by the authentication sharing service 110 and/or the gateway 116.

From operation 504, the method 500 can proceed to operation 506. At operation 506, the gateway 116 can detect a delegated device 122 on the local network 120. Operation 506 can correspond to the gateway 116 detecting a connection with the delegated device 122 or otherwise determining that the delegated device 122 has joined the local network 120 and/or connected to the gateway 116. In some embodiments, the gateway 116 can detect a connection of the delegated device 122 and determine, e.g., by checking a device list or the like, that the delegated device 122 is a device to which authentication of the user device 102 can be delegated. Because detecting the delegated device on the local network 120 can be accomplished in various manners, it should be understood that the above examples are illustrative and should not be construed as being limiting in any way.

From operation 506, the method 500 can proceed to operation 508. At operation 508, the gateway 116 can detect the user device 102 leaving the local network 120 or a proximity or location limit set during authentication as illustrated and described herein. Thus, operation 508 can correspond to the gateway 116 detecting the user device 102 leaving the local network 120, leaving a proximity of one of the local devices 118 and/or the gateway 116, leaving boundaries of a defined location, and/or otherwise leaving an area for which the user device 102 is authenticated for communications with the local device 118.

From operation 508, the method 500 can proceed to operation 510. At operation 510, the gateway 116 can determine if the authentication of the user device 102 should be delegated to the delegated device 122. According to various embodiments of the concepts and technologies disclosed herein, the gateway 116 can identify one or more devices on the local network 120 and determine if any of these devices have been identified or designated as potential delegees for the user device 102. In some embodiments, the gateway 116 can be configured with a device list, whereby a user or other entity can list identifying information for particular devices that can act as the delegated device 122. Thus, operation 510 can correspond to the gateway 116 determining if any device identified in the list is connected to the local network 120 and/or the gateway 116. If such a device is identified, the device can be designated by the gateway 116 as a delegated device, or the gateway 116 can present the user device 102 with one or more options (corresponding to the one or more devices) and obtain input from the user device 102 indicating if the authentication of the user device 102 should be designated. It should be understood that this example embodiment is illustrative, and therefore should not be construed as being limiting in any way.

If the gateway 116 determines, in operation 510, that the authentication of the user device 102 should be delegated to the delegated device 122, the method 500 can proceed to operation 512. At operation 512, the gateway 116 can delegate the authentication of the user device 102 to the delegated device 122. Thus, the user device 102 can deliver a token 114 to the delegated device 122, or the user device 102 can trigger delivery of the token 114 to the delegated device 122 (e.g., by the gateway 116 and/or the server computer 112), or the like.

If the gateway 116 determines, in operation 510, that the authentication of the user device 102 should not be delegated to the delegated device 122, the method 500 can proceed to operation 514. At operation 514, the gateway 116 can terminate the authentication of the user device 102 and not delegate the authentication of the user device 102 to any other device (e.g., including the delegated device 122). Thus, some embodiments of the concepts and technologies disclosed herein can prevent delegation of the authentication of the user device 102 in some embodiments. It should be understood that this example embodiment is illustrative, and therefore should not be construed as being limiting in any way.

From operation 514, the method 500 can proceed to operation 516. The method 500 also can proceed to operation 516 from operation 512. The method 500 can end at operation 516.

Figure 6A:
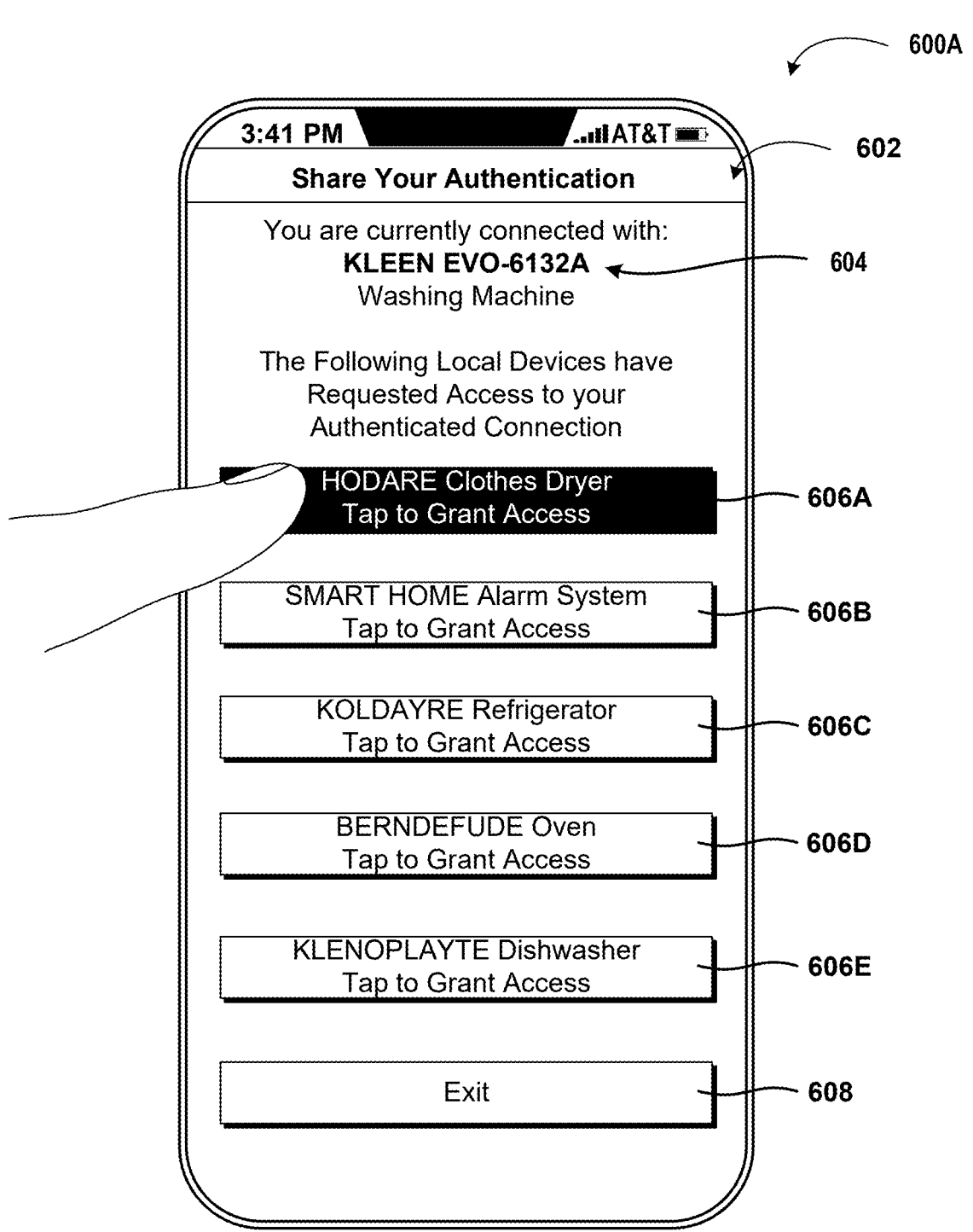
FIGS. 6A-6B are user interface diagrams showing various screen displays for use in device authentication sharing, according to some illustrative embodiments of the concepts and technologies described herein.
Figure 6B:
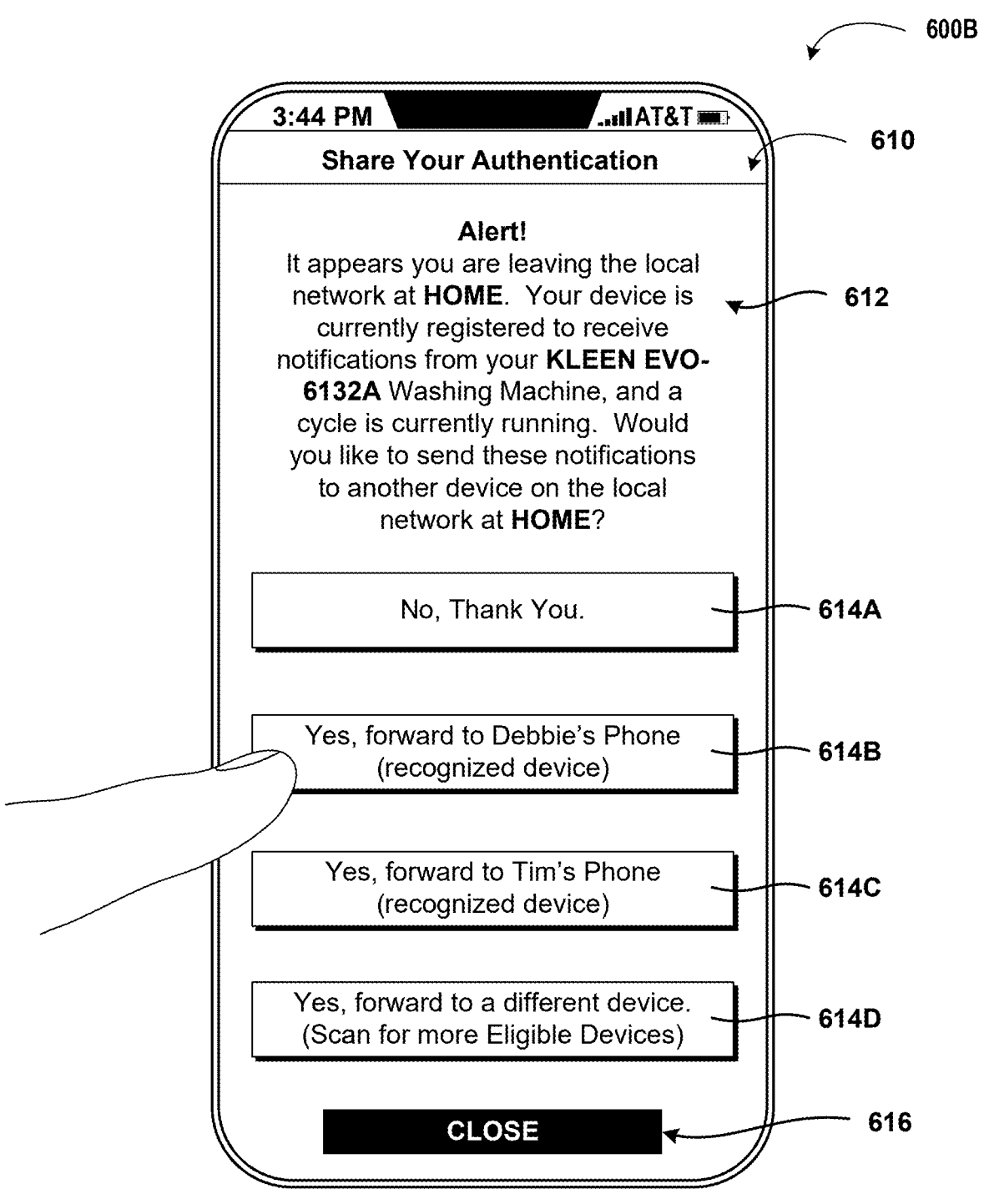

FIGS. 6A-6B are UI diagrams showing aspects of UIs for using and/or interacting with the authentication sharing application 108, the authentication sharing service 110, and/or the gateway 116 according to some illustrative embodiments of the concepts and technologies disclosed herein. FIG. 6A shows an illustrative screen display 600A. According to some embodiments of the concepts and technologies described herein, the screen display 600A can be generated by a device such as the user device 102 via interactions with the authentication sharing application 108, the authentication sharing service 110, and/or the gateway 116.

In particular, according to various embodiments of the concepts and technologies disclosed herein, the user device 102 can generate the screen display 600A and/or other screen displays using the authentication sharing application 108 described herein, which can be configured to render the screen display 600A using data generated at the user device 102, the server computer 112, and/or the gateway 116. For example, the screen display 600A can be displayed in response to receiving share requests from a number of local devices 118 (which as noted above, may generate the share request in response to receiving authentication notices from the gateway 116 in various embodiments). The user device 102 can receive the share requests (e.g., from the gateway 116) and present the devices requesting sharing of the authentication of the user device 102. Because the screen display 600A illustrated in FIG. 6A can be displayed at additional and/or alternative times, it should be understood that these examples are illustrative and therefore should not be construed as being limiting in any way. Furthermore, it should be appreciated that the UI diagram illustrated in FIG.

6A is illustrative of one contemplated example of the UIs that can be generated and/or displayed in accordance with the concepts and technologies disclosed herein, and therefore should not be construed as being limiting in any way.

The screen display 600A can include various menus and/or menu options (not shown in FIG. 6A). The screen display 600A also can include a device discovery window 602. The device discovery window 602 can be configured to present one or more local devices 118 that have requested sharing of the authentication of the user device 102 as illustrated and described herein. The device discovery window 602 can include various types of data and/or information such as, for example, an indication 604 of the local device 118 with which the user device 102 is authenticated and/or communicating. In the illustrated embodiment, the indication 604 indicates that the user device 102 is authenticated with and/or is communicating with a washing machine. It should be understood that this example embodiment is illustrative, and therefore should not be construed as being limiting in any way.

Thus, as illustrated and described herein, the device discovery window 602 also can include device selectors 606A-E (hereinafter collectively and/or generically referred to as "device selectors 606"). The device selectors 606 can provide identifiers and/or other information about local devices 118 that have requested sharing of the authentication of the user device 102 (e.g., by sending share requests to the gateway 116 and the gateway relaying those share requests to the user device 102). Thus, in the example embodiment shown in FIG. 6A, a clothes dryer, an alarm system, a refrigerator, an oven, and a dishwasher have requested sharing of the authentication of the user device 102. It can be appreciated that these examples are purely illustrative and provided for illustration purposes and are not limiting in any way. It further can be appreciated that in the embodiment shown in FIG. 6A, each of the listed local devices 118 may have received an authentication notice indicating that the user device 102 has authenticated. It should be understood that this example embodiment is illustrative, and therefore should not be construed as being limiting in any way.

As shown in FIG. 6A, a user or other entity can tap or select one of the device selectors 606 to share the authentication of the user device 102 with the corresponding local device 118 (identified on the device selector 606). In the illustrated embodiment, the user or other entity is tapping the device selector 606A, thereby electing to share the authentication of the user device 102 with the clothes dryer identified. In response to this selection, the user device 102 can send a token 114 to the gateway 116 for relaying to the identified local device 118; send a token 114 directly to the identified local device 118 via the gateway 116; or otherwise trigger delivery of the token 114 to the local device 118. Because the local device 118 can be authorized to communicate with the user device 102 in additional and/or alternative manners as illustrated and described herein, it should be understood that these example embodiments are illustrative, and therefore should not be construed as being limiting in any way.

The device discovery window 602 also can include a UI control 608 to exit the device selection and/or designation. Selection of the UI control 608 can cause the user device 102 to present additional and/or alternative user interfaces, to close the device discovery window 602, and/or to take other actions. Thus, for example, the user or other entity can select the UI control 608 to cause the user device 102 to close the device discovery window 602 when the desired information has been obtained via the device discovery window 602, when the user or other entity wishes to close the device discovery window 602 for other reasons, when all local devices 118 with which the user device 102 will communicate have been selected, and/or at other times at which the UI control 608 is selected. Because additional or alternative controls can be included in the device discovery window 602, it should be understood that the example embodiment shown in FIG. 6A is illustrative and therefore should not be construed as being limiting in any way.

FIG. 6B shows an illustrative screen display 600B. According to some embodiments of the concepts and technologies described herein, the screen display 600B can be generated by a device such as the user device 102 via interactions with the authentication sharing application 108, the authentication sharing service 110, and/or the gateway 116. For example, the user device 102 can generate the screen display 600B in response to the gateway 116, the server computer 112, and/or the user device 102 determining that the user device 102 has left or is about to leave a location or proximity defined for the authentication. Similar screen displays may be generated in response to detecting expiration of a timer or time limit defined for the authentication and/or at other times and/or other circumstances. Because the screen display 600B illustrated in FIG. 6B can be displayed at additional and/or alternative times, it should be understood that these examples are illustrative and therefore should not be construed as being limiting in any way. Furthermore, it should be appreciated that the UI diagram illustrated in FIG. 6B is illustrative of one contemplated example of the UIs that can be generated and/or displayed in accordance with the concepts and technologies disclosed herein, and therefore should not be construed as being limited in any way.

The screen display 600B can include various menus and/or menu options (not shown in FIG. 6B). The screen display 600B also can include an authentication delegation window 610. The authentication delegation window 610 can be configured to present one or more devices (e.g., the delegated device 122) that have been identified as being acceptable candidates to which authentication of the user device 102 may be delegated by the user device 102 and/or other entities. As shown in the example embodiment illustrated in FIG. 6B, two suitable candidates are identified for serving as the delegated device 122. Because zero, one, two, or more than two devices may be identified in the authentication delegation window 610, it should be understood that this example embodiment is illustrative, and therefore should not be construed as being limiting in any way.

The authentication delegation window 610 can include various types of data and/or information such as, for example, a description 612 of the local device 118 with which the user device 102 is authenticated and/or communicating along with some indication as to why delegation may be appropriate and/or desirable. In the illustrated embodiment, the description 612 indicates that the user device 102 is authenticated with and/or is communicating with a washing machine, and that the user device 102 appears to be leaving a local network 120. This description 612 further can prompt the user or other entity to select whether authentication should or should not be delegated to another device. It should be understood that this example embodiment is illustrative, and therefore should not be construed as being limiting in any way.

The authentication delegation window 610 also can include delegation options 614A-D (hereinafter collectively and/or generically referred to as "delegation options 614"). The delegation options 614 can provide identifiers and/or other information about one or more devices on the local network 120. The identifiers and/or other information can identify those devices with which sharing of the authentication of the user device 102 is appropriate and/or acceptable. Thus, it can be appreciated that in various embodiments the gateway 116 and/or the authentication sharing service 110 can determine what devices are on the local network 120, which of those devices are authorized to be delegated via sharing of the authentication of the user device 102, and the like. These devices may have been identified during some previous operation, setup, via preferences associated with the authentication sharing application 108, or the like. In the example embodiment shown in FIG. 6B, at least two devices appear as possible delegees, i.e., devices that can act as the delegated device 122. It should be understood that this example embodiment is illustrative and should not be construed as being limiting in any way.

In the illustrated embodiment, the delegation option 614A corresponds to an option not to delegate authentication of the user device 102 to any device. The delegation option 614B can correspond to an option to delegate authentication of the user device 102 to another phone (in this case "Debbie's Phone"), which thereby can act as the delegated device 122. The delegation option 614C can correspond to an option to delegate authentication of the user device 102 to yet another phone (in this case "Tim's Phone"), which thereby can act as the delegated device 122. The delegation option 614D corresponds to an option to scan the local network 120 (or to trigger the gateway 116 to scan the local network 120) for another device that will act as the delegated device 122. It should be understood that these example delegation options 614 are illustrative, and therefore should not be construed as being limiting in any way.

As shown in FIG. 6B, a user or other entity can tap or select one of the delegation options 614 to choose not to delegate the authentication of the user device 102, to delegate the authentication of the user device 102 with the corresponding device (as identified on the delegation option 614); or to search for more devices. In the illustrated embodiment, the user or other entity is tapping the delegation option 614B, thereby electing to delegate the authentication of the user device 102 to "Debbie's Phone." In response to this selection, the user device 102 can send a token 114 to "Debbie's Phone," thereby making "Debbie's Phone" the delegated device 122 illustrated and described herein. In some embodiments, the token 114 can be sent to "Debbie's Phone" by the gateway 116, the server computer 112, or other devices or entities. Thus, the example embodiment shown in FIG. 6B is illustrative, and therefore should not be construed as being limiting in any way.

The authentication delegation window 610 also can include a UI control 616 to close the device selection and/or delegation operation. Selection of the UI control 616 can cause the user device 102 to present additional and/or alternative user interfaces, to close the authentication delegation window 610, and/or to take other actions. Thus, for example, the user or other entity can select the UI control 616 to cause the user device 102 to close the authentication delegation window 610 when the desired information has been obtained via the authentication delegation window 610 and/or when the user or other entity wishes to close the authentication delegation window 610 for other reasons. Because additional or alternative controls can be included in the authentication delegation window 610, it should be understood that the example embodiment shown in FIG. 6B is illustrative and therefore should not be construed as being limiting in any way.

Figure 7:
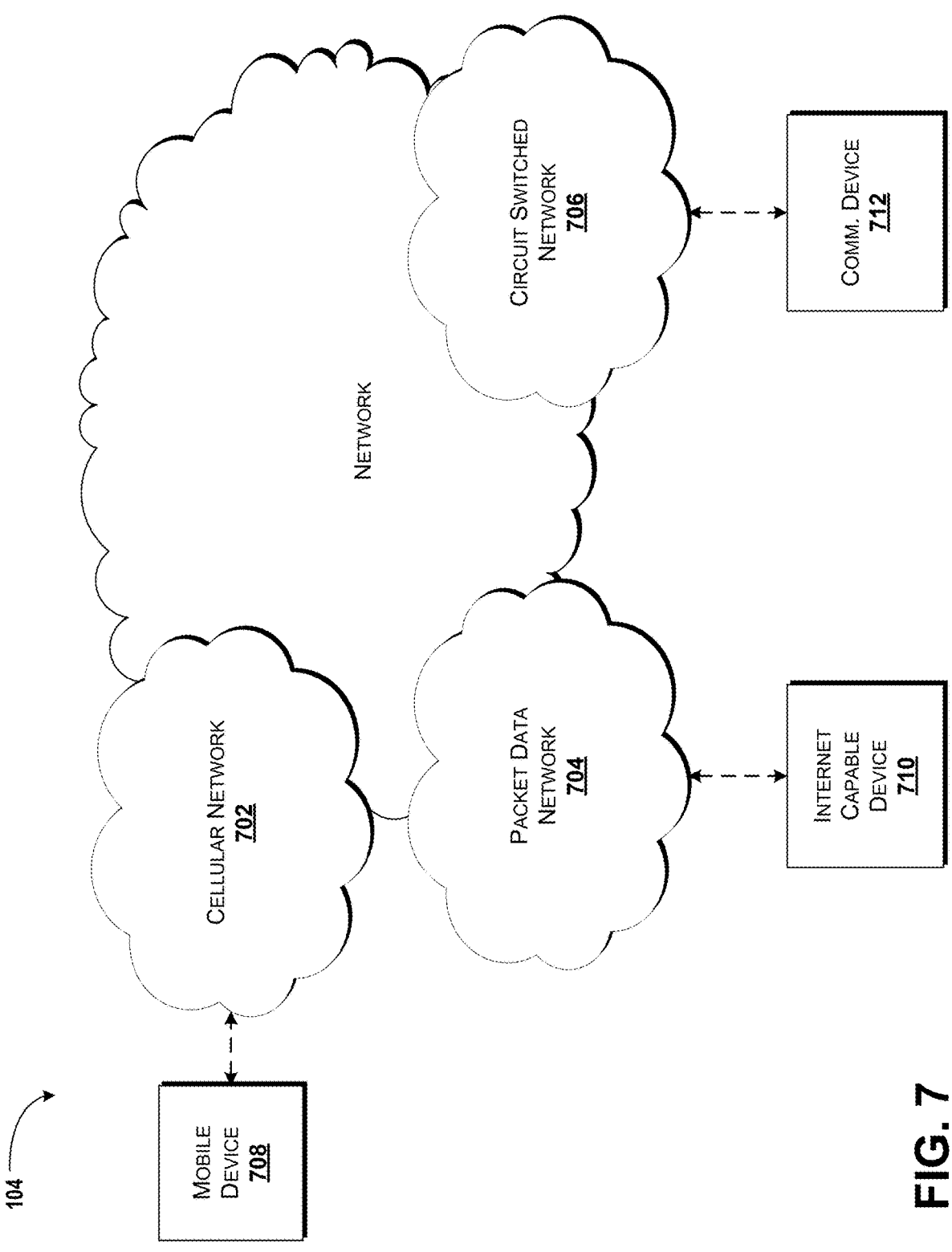
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs"); mobile management entities ("MMEs"); access and mobility management functions ("AMFs"); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 702 also can include various interfaces between various components, as is generally understood. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards, 5G mobile communications standards, 6G mobile communication standards, other mobile communications standards, and evolved and future mobile communications standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
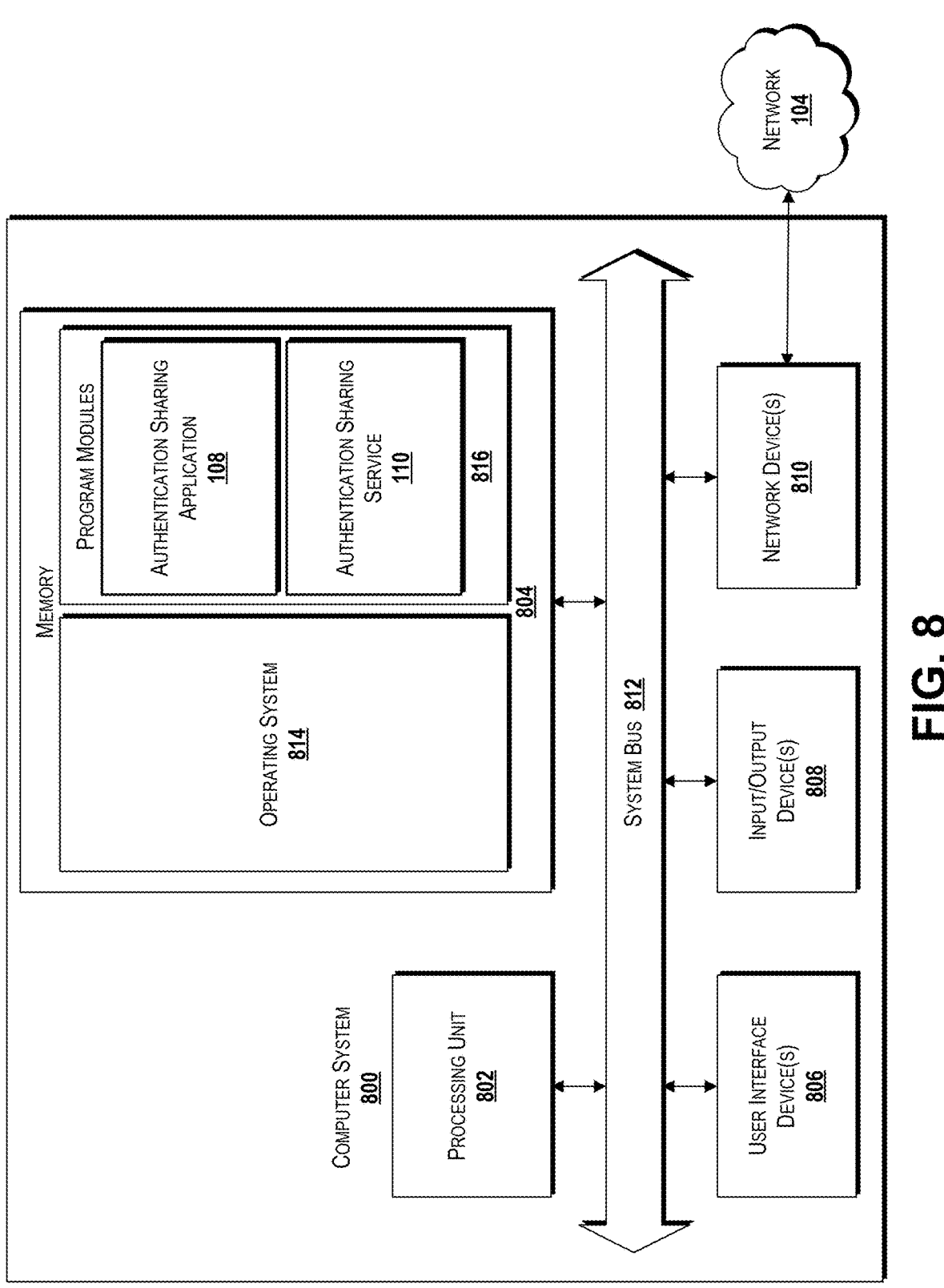
FIG. 8 is a block diagram illustrating an example computer system configured to enable device authentication sharing, according to some illustrative embodiments of the concepts and technologies described herein.

FIG. 8 is a block diagram illustrating a computer system 800 configured to provide the functionality described herein for device authentication sharing, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The system bus 812 can enable bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the authentication sharing application 108 and/or the authentication sharing service 110. These and/or other programs can be embodied in computer-readable media containing instructions that, when executed by the processing unit 802, perform one or more of the methods 200, 300, 400, and 500 described in detail above with respect to FIGS. 2-5 and/or other functionality as illustrated and described herein. It can be appreciated that, at least by virtue of the instructions embodying the methods 200, 300, 400, and 500, and/or other functionality illustrated and described herein being stored in the memory 804 and/or accessed and/or executed by the processing unit 802, the computer system 800 is a special-purpose computing system that can facilitate providing the functionality illustrated and described herein. According to embodiments, the program modules 816 may be embodied in hardware, software, firmware, or any combination thereof. Although not shown in FIG. 8, it should be understood that the memory 804 also can be configured to store the token 114, the authentication data 124, the authentication communications 126, the notification 128, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
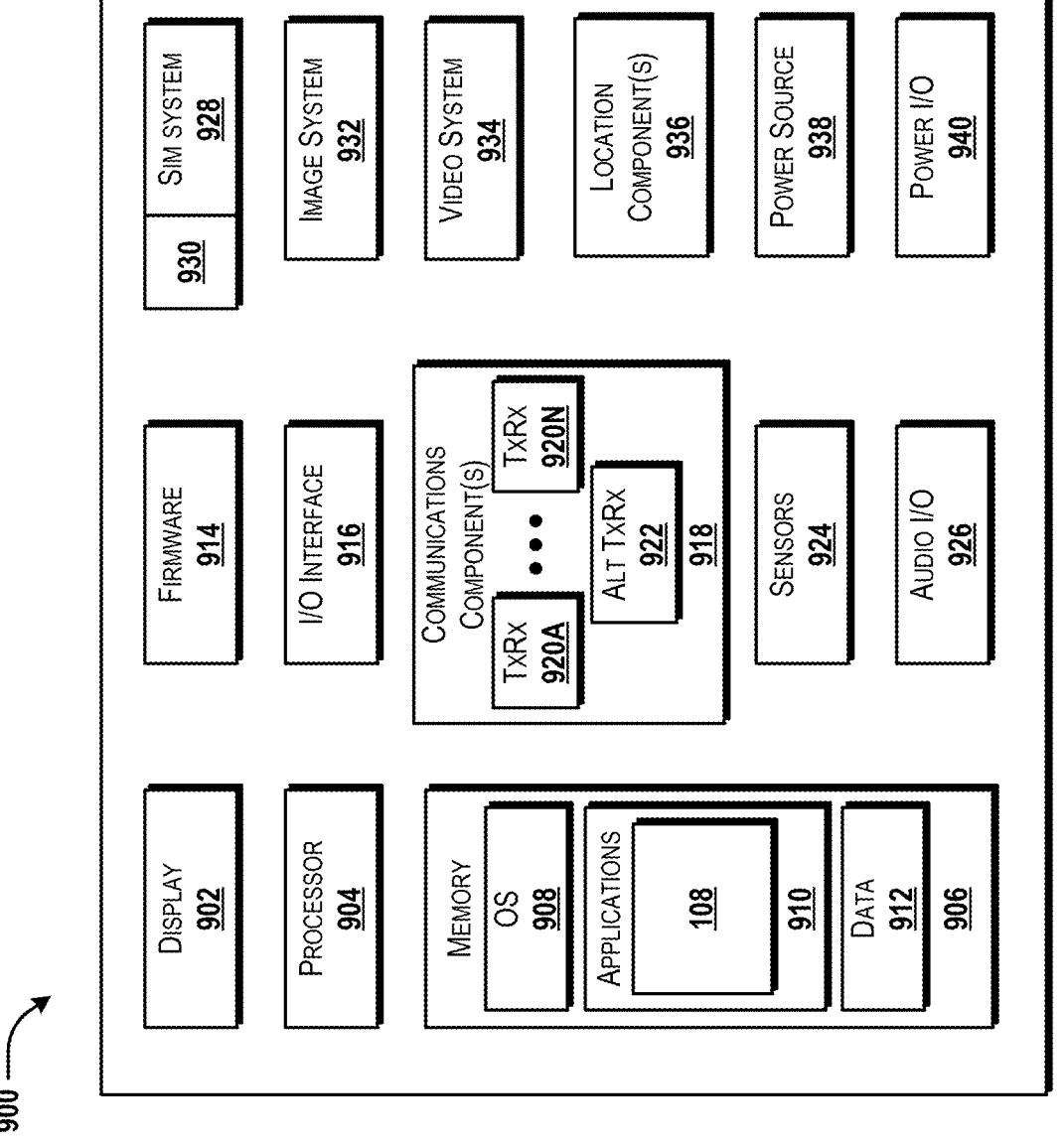
FIG. 9 is a block diagram illustrating an example mobile device configured to interact with an authentication sharing service, according to some illustrative embodiments of the concepts and technologies described herein.

Turning now to FIG. 9, an illustrative mobile device 900 and components thereof will be described. In some embodiments, the user device 102 and/or delegated device 122 described above with reference to FIGS. 1-6B can be configured as and/or can have an architecture similar or identical to the mobile device 900 described herein in FIG. 9. It should be understood, however, that the user device 102 and/or the delegated device 122 may or may not include the functionality described herein with reference to FIG. 9. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements such as, for example, authentication sharing screens, device delegation screens, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the authentication sharing application 108, the authentication sharing service 110, other computer-executable instructions stored in a memory 906, or the like. In some embodiments, the applications 910 also can include a UI application (not illustrated in FIG. 9).

The UI application can interface with the operating system 908, such as the operating system 106 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, selecting local devices 118 to share authentication with, designating a device to delegate the authentication to, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, the authentication sharing application 108, the authentication sharing service 110, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904.

It can be appreciated that, at least by virtue of storage of the instructions corresponding to the applications 910 and/or other instructions embodying other functionality illustrated and described herein in the memory 906, and/or by virtue of the instructions corresponding to the applications 910 and/or other instructions embodying other functionality illustrated and described herein being accessed and/or executed by the processor 904, the mobile device 900 is a special-purpose mobile device that can facilitate providing the functionality illustrated and described herein. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, device lists, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 104 and/or local network 120 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, 5G, 6G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system ("image system") 932. The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
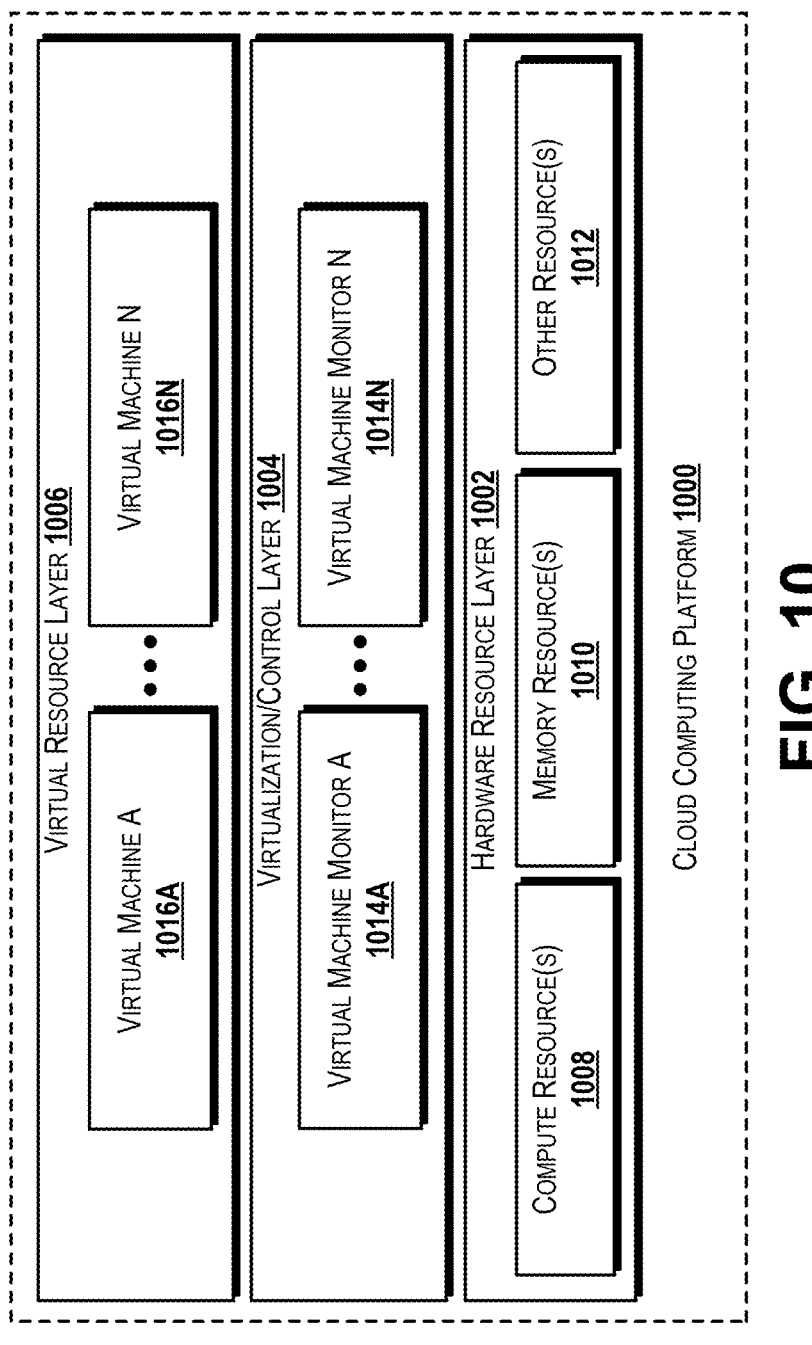
FIG. 10 is a diagram illustrating a computing environment capable of implementing aspects of the concepts and technologies disclosed herein, according to some illustrative embodiments of the concepts and technologies described herein.

FIG. 10 illustrates an illustrative architecture for a cloud computing platform 1000 that can be capable of executing the software components described herein for device authentication sharing and/or for interacting with the authentication sharing application 108 and/or the authentication sharing service 110. Thus, it can be appreciated that in some embodiments of the concepts and technologies disclosed herein, the cloud computing platform 1000 illustrated in FIG. 10 can be used to provide the functionality described herein with respect to the user device 102, the server computer 112, the gateway 116, the local devices 118, and/or the delegated device 122.

The cloud computing platform 1000 thus may be utilized to execute any aspects of the software components presented herein. Thus, according to various embodiments of the concepts and technologies disclosed herein, the authentication sharing application 108 and/or the authentication sharing service 110 can be implemented, at least in part, on or by elements included in the cloud computing platform 1000 illustrated and described herein. Those skilled in the art will appreciate that the illustrated cloud computing platform 1000 is a simplification of but only one possible implementation of an illustrative cloud computing platform, and as such, the illustrated cloud computing platform 1000 should not be construed as being limiting in any way.

In the illustrated embodiment, the cloud computing platform 1000 can include a hardware resource layer 1002, a virtualization/control layer 1004, and a virtual resource layer 1006. These layers and/or other layers can be configured to cooperate with each other and/or other elements of a cloud computing platform 1000 to perform operations as will be described in detail herein. While connections are shown between some of the components illustrated in FIG. 10, it should be understood that some, none, or all of the components illustrated in FIG. 10 can be configured to interact with one another to carry out various functions described herein. In some embodiments, the components are arranged so as to communicate via one or more networks such as, for example, the network 104 illustrated and described hereinabove (not shown in FIG. 10). Thus, it should be understood that FIG. 10 and the following description are intended to provide a general understanding of a suitable environment in which various aspects of embodiments can be implemented, and should not be construed as being limiting in any way.

The hardware resource layer 1002 can provide hardware resources. In the illustrated embodiment, the hardware resources can include one or more compute resources 1008, one or more memory resources 1010, and one or more other resources 1012. The compute resource(s) 1008 can include one or more hardware components that can perform computations to process data, and/or to execute computer-executable instructions of one or more application programs, operating systems, services, and/or other software including, but not limited to, the authentication sharing application 108 and/or the authentication sharing service 110 illustrated and described herein.

According to various embodiments, the compute resources 1008 can include one or more central processing units ("CPUs"). The CPUs can be configured with one or more processing cores. In some embodiments, the compute resources 1008 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1008 can include one or more discrete GPUs. In some other embodiments, the compute resources 1008 can include one or more CPU and/or GPU components that can be configured in accordance with a co-processing CPU/GPU computing model. Thus, it can be appreciated that in some embodiments of the compute resources 1008, a sequential part of an application can execute on a CPU and a computationally-intensive part of the application can be accelerated by the GPU. It should be understood that this example is illustrative, and therefore should not be construed as being limiting in any way.

In some embodiments, the compute resources 1008 also can include one or more system on a chip ("SoC") components. It should be understood that an SoC component can operate in association with one or more other components as illustrated and described herein, for example, one or more of the memory resources 1010 and/or one or more of the other resources 1012. In some embodiments in which an SoC component is included, the compute resources 1008 can be or can include one or more embodiments of the SNAP-DRAGON brand family of SoCs, available from QUAL-COMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 1008 can be or can include one or more hardware components arranged in accordance with an ARM architecture, available for license from ARM HOLD-INGS of Cambridge, United Kingdom. Alternatively, the compute resources 1008 can be or can include one or more hardware components arranged in accordance with an x86 architecture, such as an architecture available from INTEL CORPORATION of Mountain View, California, and others. Those skilled in the art will appreciate the implementation of the compute resources 1008 can utilize various computation architectures and/or processing architectures. As such, the various example embodiments of the compute resources 1008 as mentioned hereinabove should not be construed as being limiting in any way. Rather, implementations of embodiments of the concepts and technologies disclosed herein can be implemented using compute resources 1008 having any of the particular computation architecture and/or combination of computation architectures mentioned herein as well as other architectures.

Although not separately illustrated in FIG. 10, it should be understood that the compute resources 1008 illustrated and described herein can host and/or execute various services, applications, portals, and/or other functionality illustrated and described herein. Thus, the compute resources 1008 can host and/or can execute the authentication sharing application 108 and/or the authentication sharing service 110 or other applications or services illustrated and described herein.

The memory resource(s) 1010 can include one or more hardware components that can perform or provide storage operations, including temporary and/or permanent storage operations. In some embodiments, the memory resource(s) 1010 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1008, subject to the definition of "computer storage media" provided above (e.g., as excluding waves and signals per se and/or communication media as defined in this application).

Although not illustrated in FIG. 10, it should be understood that the memory resources 1010 can host or store the various data illustrated and described herein including, but not limited to, the tokens 114, the authentication data 124, the authentication communications 126, and/or other data, if desired. It should be understood that this example is illustrative, and therefore should not be construed as being limiting in any way.

The other resource(s) 1012 can include any other hardware resources that can be utilized by the compute resources (s) 1008 and/or the memory resource(s) 1010 to perform operations. The other resource(s) 1012 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1002 can be virtualized by one or more virtual machine monitors ("VMMs") 1014A-1014N (also known as "hypervisors;" hereinafter "VMMs 1014"). The VMMs 1014 can operate within the virtualization/control layer 1004 to manage one or more virtual resources that can reside in the virtual resource layer 1006. The VMMs 1014 can be or can include software, firmware, and/or hardware that alone or in combination with other software, firmware, and/or hardware, can manage one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016").

Based on the foregoing, it should be appreciated that systems and methods for device authentication sharing have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
detecting, at a gateway of a local network, authentication of a user device for communication with a first local device, wherein the first local device is in communication with the gateway via the local network,
sending, by the gateway and to a second local device operating on the local network, an authentication notice that indicates that the user device has authenticated for communication with the first local device, receiving, by the gateway and from the second local device, a share request requesting sharing of the authentication of the user device with the second local device,
obtaining, by the gateway, a token that defines a permission associated with the authentication, a time limit associated with the authentication, and a location limit associated with the authentication, and
triggering delivery of the token to the second local device to share the authentication of the user device with the second local device, whereby the second local device communicates with the user device via a connection supported by the gateway.

2. The device of claim 1, wherein the computer-executable instructions, when executed by the processor, cause the processor to perform operations further comprising:
monitoring, by the gateway, the connection to track a time duration of the connection and a location of the user device;
determining, by the gateway, if the connection should be terminated based on the time duration, the location of the user device, the time limit, and the location limit; and
in response to a determination that the connection should be terminated, revoking the authentication and terminating the connection.

3. The device of claim 2, wherein the location limit comprises a proximity between the user device and the first local device that must be maintained, and wherein the determination that the connection should be terminated comprises a determination that the location of the user device is outside the proximity.

4. The device of claim 1, wherein the computer-executable instructions, when executed by the processor, cause the processor to perform operations further comprising:
detecting a delegated device on the local network;
detecting the user device leaving the local network;
determining if the authentication of the user device should be delegated to the delegated device; and
in response to a determination that the authentication of the user device should be delegated to the delegated device, triggering delivery of the token to the delegated device.

5. The device of claim 4, wherein in response to detecting that the authentication of the user device has been delegated to the delegated device, notifications from the first local device and from the second local device are sent to the delegated device instead of the user device.

6. The device of claim 1, wherein obtaining the token comprises receiving, from the user device, the token, wherein the token comprises a data file generated by the user device, the data file identifying the permission, the time limit, content, and the location limit.

7. The device of claim 1, wherein the user device is authenticated by an authentication sharing service hosted by a server computer, and wherein obtaining the token comprises receiving, from the server computer, the token, wherein the token comprises a data file generated by the user device, the data file identifying the permission, the time limit, and the location limit.

8. A method comprising:
detecting, at a gateway of a local network, authentication of a user device for communication with a first local device, wherein the first local device is in communication with the gateway via the local network;
sending, by the gateway and to a second local device operating on the local network, an authentication notice that indicates that the user device has authenticated for communication with the first local device;

receiving, by the gateway and from the second local device, a share request requesting sharing of the authentication of the user device with the second local device;

obtaining, by the gateway, a token that defines a permission associated with the authentication, a time limit associated with the authentication, and a location limit associated with the authentication; and triggering delivery of the token to the second local device to share the authentication of the user device with the second local device, whereby the second local device communicates with the user device via a connection supported by the gateway.

9. The method of claim 8, further comprising:

monitoring, by the gateway, the connection to track a time duration of the connection and a location of the user device;

determining, by the gateway, if the connection should be terminated based on the time duration, the location of the user device, the time limit, and the location limit; and in response to a determination that the connection should be terminated, revoking the authentication and terminating the connection.

10. The method of claim 9, wherein the location limit comprises a proximity between the user device and the first local device that must be maintained, and wherein the determination that the connection should be terminated comprises a determination that the location of the user device is outside the proximity.

11. The method of claim 8, further comprising:

detecting a delegated device on the local network;

detecting the user device leaving the local network;

determining if the authentication of the user device should be delegated to the delegated device; and in response to a determination that the authentication of the user device should be delegated to the delegated device, triggering delivery of the token to the delegated device.

12. The method of claim 11, wherein in response to detecting that the authentication of the user device has been delegated to the delegated device, notifications from the first local device and from the second local device are sent to the delegated device instead of the user device.

13. The method of claim 8, wherein obtaining the token comprises receiving, from the user device, the token, wherein the token comprises a data file generated by the user device, the data file identifying the permission, the time limit, and the location limit.

14. A computer storage medium having computer-executable instructions stored thereon that, when executed by a processor, cause the processor to perform operations comprising:

detecting, at a gateway of a local network, authentication of a user device for communication with a first local device, wherein the first local device is in communication with the gateway via the local network;

sending, by the gateway and to a second local device operating on the local network, an authentication notice that indicates that the user device has authenticated for communication with the first local device;

receiving, by the gateway and from the second local device, a share request requesting sharing of the authentication of the user device with the second local device;

obtaining, by the gateway, a token that defines a permission associated with the authentication, a time limit associated with the authentication, and a location limit associated with the authentication; and triggering delivery of the token to the second local device to share the authentication of the user device with the second local device, whereby the second local device communicates with the user device via a connection supported by the gateway.

15. The computer storage medium of claim 14, wherein the computer-executable instructions, when executed by the processor, cause the processor to perform operations further comprising:

monitoring, by the gateway, the connection to track a time duration of the connection and a location of the user device;

determining, by the gateway, if the connection should be terminated based on the time duration, the location of the user device, the time limit, and the location limit; and in response to a determination that the connection should be terminated, revoking the authentication and terminating the connection.

16. The computer storage medium of claim 15, wherein the location limit comprises a proximity between the user device and the first local device that must be maintained, and wherein the determination that the connection should be terminated comprises a determination that the location of the user device is outside the proximity.

17. The computer storage medium of claim 14, wherein the computer-executable instructions, when executed by the processor, cause the processor to perform operations further comprising:

detecting a delegated device on the local network;

detecting the user device leaving the local network;

determining if the authentication of the user device should be delegated to the delegated device; and in response to a determination that the authentication of the user device should be delegated to the delegated device, triggering delivery of the token to the delegated device.

18. The computer storage medium of claim 17, wherein in response to detecting that the authentication of the user device has been delegated to the delegated device, notifications from the first local device and from the second local device are sent to the delegated device instead of the user device.

19. The computer storage medium of claim 14, wherein obtaining the token comprises receiving, from the user device, the token, wherein the token comprises a data file generated by the user device, the data file identifying the permission, the time limit, and the location limit.

20. The computer storage medium of claim 14, wherein the user device is authenticated by an authentication sharing service hosted by a server computer, and wherein obtaining the token comprises receiving, from the server computer, the token, wherein the token comprises a data file generated by the user device, the data file identifying the permission, the time limit, and the location limit.

* * * * *